(12) United States Patent
Fliearman et al.

(10) Patent No.: US 11,415,199 B2
(45) Date of Patent: *Aug. 16, 2022

(54) BI-DIRECTIONAL MULTI-SPEED DRIVE

(71) Applicant: Deere & Company, Moline, IL (US)

(72) Inventors: Steven R. Fliearman, Coffeyville, KS (US); Lisa R. Lloyd, Independence, KS (US)

(73) Assignee: DEERE & COMPANY, Moline, IL (US)

(*) Notice: Subject to any disclaimer, the term of this patent is extended or adjusted under 35 U.S.C. 154(b) by 159 days.

This patent is subject to a terminal disclaimer.

(21) Appl. No.: 16/887,973

(22) Filed: May 29, 2020

(65) Prior Publication Data

US 2021/0372504 A1 Dec. 2, 2021

(51) Int. Cl.
*F16H 3/66* (2006.01)
*F16H 3/00* (2006.01)
(Continued)

(52) U.S. Cl.
CPC ............ *F16H 3/663* (2013.01); *F16H 3/005* (2013.01); *F16H 61/32* (2013.01);
(Continued)

(58) Field of Classification Search
CPC .... F16H 3/66; F16H 3/663; F16H 2200/2005; F16H 2200/2007; F16H 2200/2035;
(Continued)

(56) References Cited

U.S. PATENT DOCUMENTS

| 2,685,948 A | 8/1954 | Freeman et al. |
| 3,062,073 A | 11/1962 | Brass |

(Continued)

FOREIGN PATENT DOCUMENTS

| DE | 69218975 T2 | 6/1994 |
| DE | 19745995 A1 | 9/1998 |

(Continued)

OTHER PUBLICATIONS

USPTO non-final office action issued in pending Utility U.S. Appl. No. 16/386,052 dated Oct. 30, 2020.

(Continued)

*Primary Examiner* — Ernesto A Suarez
*Assistant Examiner* — Lori Wu
(74) *Attorney, Agent, or Firm* — Klintworth & Rozenblat IP LLP

(57) ABSTRACT

A bi-directional drive assembly for a work vehicle has a reaction member fixed with respect to or a part of a drive housing. A driveshaft is rotatable about a drive axis relative to the reaction member in a first rotation direction and alternatively in a second rotation direction. A planetary set is coupled to the drive shaft and configured to rotate an output hub in the first or second rotation direction. A clutch assembly is coupled to the reaction member and includes a first clutch and a second clutch. The first clutch is configured to interface the planetary set with the reaction member to effect a first rotation speed of the output hub in the first rotation direction and alternatively the second rotation direction. The second clutch is configured to interface the planetary set with the reaction member to effect a second rotation speed of the output hub in the first rotation direction and alternatively the second rotation direction. An actuator arrangement is configured to effect movement of the first clutch and the second clutch along the drive axis to selectively engage the planetary set.

19 Claims, 15 Drawing Sheets

(51) Int. Cl.
  *F16H 61/32* (2006.01)
  *F16H 1/32* (2006.01)
  *F16H 61/28* (2006.01)

(52) U.S. Cl.
  CPC .......... F16H 2001/327 (2013.01); F16H 2061/2853 (2013.01); F16H 2200/2005 (2013.01); F16H 2200/2038 (2013.01); F16H 2200/2064 (2013.01); F16H 2200/2094 (2013.01)

(58) Field of Classification Search
  CPC ..... F16H 2200/2038; F16H 2200/2064; F16H 2200/2094; F16H 2200/0034; F16H 2200/0039; F16H 3/005; F16H 2001/327; F16H 61/32; F16H 2061/2853
  See application file for complete search history.

(56) References Cited

U.S. PATENT DOCUMENTS

| | | | |
|---|---|---|---|
| 3,081,759 A | 3/1963 | Mauck et al. | |
| 3,150,544 A | 9/1964 | Brass | |
| 3,640,152 A | 2/1972 | Shirai et al. | |
| 3,675,511 A | 7/1972 | Wakamatsu et al. | |
| 3,942,024 A | 3/1976 | Ingham | |
| 4,122,354 A | 10/1978 | Howland | |
| 4,213,299 A | 7/1980 | Sharer | |
| 4,473,752 A | 9/1984 | Cronin | |
| 4,484,495 A | 11/1984 | Mason | |
| 4,631,455 A | 12/1986 | Taishoff | |
| 4,708,030 A | 11/1987 | Cordner | |
| 4,750,384 A | 6/1988 | Belliveau | |
| 4,862,009 A | 8/1989 | King | |
| 4,926,713 A | 5/1990 | Madill | |
| 5,033,994 A | 7/1991 | Wu | |
| 5,177,968 A | 1/1993 | Fellows | |
| 5,418,400 A | 5/1995 | Stockton | |
| 5,558,173 A | 9/1996 | Sherman | |
| 5,856,709 A | 1/1999 | Ibaraki | |
| 5,993,354 A | 11/1999 | Winks | |
| 6,015,363 A | 1/2000 | Mathis | |
| 6,371,877 B1 | 4/2002 | Schroeder et al. | |
| 6,378,479 B1 | 4/2002 | Nishidate et al. | |
| RE37,743 E | 6/2002 | Yang | |
| 6,409,622 B1 | 6/2002 | Bolz et al. | |
| 6,484,596 B2 | 11/2002 | Puchas | |
| 6,527,658 B2 | 3/2003 | Holmes et al. | |
| 6,569,054 B2 | 5/2003 | Kato | |
| 6,582,333 B2 | 6/2003 | Man | |
| 6,661,109 B2 | 12/2003 | Fukasaku et al. | |
| 6,746,354 B1 | 6/2004 | Ziemer | |
| 6,770,005 B2 | 8/2004 | Aikawa et al. | |
| 6,811,010 B1 | 11/2004 | Armstrong | |
| 6,832,970 B2 | 12/2004 | Eibler | |
| 6,852,063 B2 | 2/2005 | Takahashi et al. | |
| 6,910,453 B2 | 6/2005 | Sugino et al. | |
| 6,965,173 B2 | 11/2005 | Fukasaku et al. | |
| 7,028,794 B2 | 4/2006 | Odahara et al. | |
| 7,044,255 B2 | 5/2006 | Maeda et al. | |
| 7,086,978 B2 | 8/2006 | Aikawa et al. | |
| 7,117,965 B2 | 10/2006 | Yatabe et al. | |
| 7,223,191 B2 | 5/2007 | Aikawa et al. | |
| 7,374,031 B2 | 5/2008 | Skorucak | |
| 7,387,043 B2 | 6/2008 | Sakamoto et al. | |
| 7,503,871 B2 | 3/2009 | Kozarekar | |
| 7,582,033 B2 | 9/2009 | Kefti-Cherif et al. | |
| 7,753,147 B2 | 7/2010 | Usoro | |
| 7,780,562 B2 | 8/2010 | King et al. | |
| 8,143,735 B2 | 3/2012 | Bauer | |
| 8,226,517 B2 | 7/2012 | Tsai et al. | |
| 8,235,859 B2 | 8/2012 | Yun | |
| 8,480,529 B2 | 7/2013 | Pohl et al. | |
| 8,500,601 B2 | 8/2013 | Arnold et al. | |
| 8,584,359 B1 | 11/2013 | Bowman | |
| 8,727,944 B2 | 5/2014 | Noboru et al. | |
| 8,734,281 B2 | 5/2014 | Ai et al. | |
| 8,996,227 B2 | 3/2015 | Sisk et al. | |
| 9,017,207 B2 | 4/2015 | Pohl et al. | |
| 9,074,656 B2 | 7/2015 | Benz et al. | |
| 9,145,136 B2 | 9/2015 | Suntharalingam et al. | |
| 9,184,646 B2 | 11/2015 | Fulton | |
| 9,261,064 B2 | 2/2016 | Patel et al. | |
| 9,371,810 B2 | 6/2016 | Creviston | |
| 9,421,855 B2 | 8/2016 | Suntharalingam et al. | |
| 9,541,172 B1 | 1/2017 | Wright | |
| 9,555,795 B2 | 1/2017 | Nefcy et al. | |
| 9,676,265 B2 | 6/2017 | Choi | |
| 9,726,282 B2 | 8/2017 | Pohl et al. | |
| 9,829,103 B2 | 11/2017 | Volpert | |
| 10,183,569 B2 | 1/2019 | Toyota et al. | |
| 10,422,389 B2 | 9/2019 | Ebihara | |
| 10,479,187 B2 | 11/2019 | Lubben et al. | |
| 10,487,918 B2 | 11/2019 | Turner et al. | |
| 10,518,626 B2 | 12/2019 | Pettersson | |
| 10,519,920 B2 | 12/2019 | Patil et al. | |
| 10,591,025 B2 | 3/2020 | Fliearman et al. | |
| 10,619,711 B2 | 4/2020 | Fliearman et al. | |
| 2001/0019210 A1 | 9/2001 | Fukasaku et al. | |
| 2001/0025621 A1 | 10/2001 | Shiraishi et al. | |
| 2001/0042649 A1 | 11/2001 | Maeda et al. | |
| 2002/0019284 A1 | 2/2002 | Aikawa et al. | |
| 2002/0033059 A1 | 3/2002 | Pels et al. | |
| 2002/0117860 A1 | 8/2002 | Man et al. | |
| 2002/0139592 A1 | 10/2002 | Fukasaku et al. | |
| 2002/0177504 A1 | 11/2002 | Pels | |
| 2003/0001391 A1 | 1/2003 | Kuang et al. | |
| 2003/0104900 A1 | 6/2003 | Takahashi | |
| 2003/0224888 A1 | 12/2003 | Wilder et al. | |
| 2004/0055800 A1 | 3/2004 | Katou et al. | |
| 2004/0116226 A1 | 6/2004 | Baker et al. | |
| 2006/0111211 A1 | 5/2006 | Kefti-Cherif et al. | |
| 2006/0154771 A1 | 7/2006 | Klemen et al. | |
| 2006/0166777 A1 | 7/2006 | Aikawa et al. | |
| 2007/0108006 A1 | 5/2007 | Schmid et al. | |
| 2007/0157899 A1 | 7/2007 | Seufert et al. | |
| 2007/0265126 A1 | 11/2007 | Janson et al. | |
| 2008/0179119 A1 | 7/2008 | Grenn et al. | |
| 2008/0179159 A1 | 7/2008 | Pollman | |
| 2008/0314195 A1 | 12/2008 | Andoh et al. | |
| 2009/0055061 A1 | 2/2009 | Zhu | |
| 2009/0176611 A1 | 7/2009 | Avery | |
| 2009/0264241 A1 | 10/2009 | Dittrich et al. | |
| 2009/0312145 A1 | 12/2009 | Pohl et al. | |
| 2010/0029428 A1 | 2/2010 | Abe et al. | |
| 2010/0044183 A1 | 2/2010 | Guggolz et al. | |
| 2010/0048338 A1 | 2/2010 | Si | |
| 2010/0063704 A1 | 3/2010 | Okubo et al. | |
| 2010/0076634 A1 | 3/2010 | Brigham | |
| 2010/0190602 A1 | 7/2010 | Wittkopp et al. | |
| 2010/0234166 A1 | 9/2010 | Samie et al. | |
| 2011/0010031 A1 | 1/2011 | Syed et al. | |
| 2011/0015020 A1 | 1/2011 | Grosser | |
| 2011/0053729 A1 | 3/2011 | Parsons et al. | |
| 2011/0070999 A1 | 3/2011 | Soliman et al. | |
| 2011/0263379 A1 | 10/2011 | Liang et al. | |
| 2012/0103293 A1 | 5/2012 | Robinette et al. | |
| 2012/0165156 A1 | 6/2012 | Oguri | |
| 2012/0235473 A1 | 9/2012 | Jiang et al. | |
| 2012/0240723 A1 | 9/2012 | Gluckler et al. | |
| 2012/0316026 A1 | 12/2012 | Oguri et al. | |
| 2013/0046427 A1 | 2/2013 | Hohenberg | |
| 2013/0252773 A1 | 9/2013 | Suntharalingam et al. | |
| 2013/0316873 A1 | 11/2013 | Jansen et al. | |
| 2014/0011619 A1 | 1/2014 | Pohl et al. | |
| 2014/0128205 A1 | 5/2014 | Phillips et al. | |
| 2014/0137824 A1 | 5/2014 | Jacques et al. | |
| 2014/0150604 A1 | 6/2014 | Kaltenbach | |
| 2014/0256490 A1 | 9/2014 | Honda | |
| 2015/0143936 A1 | 5/2015 | Eo et al. | |
| 2015/0226323 A1 | 8/2015 | Pohl et al. | |
| 2015/0239335 A1 | 8/2015 | Wachter et al. | |
| 2016/0031438 A1 | 2/2016 | Matsui et al. | |
| 2016/0031439 A1 | 2/2016 | Nefcy et al. | |

(56) References Cited

U.S. PATENT DOCUMENTS

| | | | |
|---|---|---|---|
| 2016/0052382 | A1 | 2/2016 | Clark et al. |
| 2016/0076629 | A1 | 3/2016 | Modrzejewski et al. |
| 2016/0082821 | A1 | 3/2016 | Mueller et al. |
| 2016/0096522 | A1 | 4/2016 | Ortmann et al. |
| 2016/0137045 | A1 | 5/2016 | Zhu et al. |
| 2016/0200311 | A1 | 7/2016 | Nefcy et al. |
| 2016/0207525 | A1 | 7/2016 | Nefcy et al. |
| 2016/0258495 | A1 | 9/2016 | Bird |
| 2016/0288780 | A1 | 10/2016 | Shukla et al. |
| 2016/0348741 | A1 | 12/2016 | Niemiec et al. |
| 2017/0050508 | A1* | 2/2017 | Pritchard .......... B60K 17/02 |
| 2017/0248196 | A1 | 8/2017 | Turner et al. |
| 2017/0328470 | A1 | 11/2017 | Pohl et al. |
| 2017/0368925 | A1 | 12/2017 | Maki |
| 2018/0100564 | A1 | 4/2018 | Fliearman et al. |
| 2018/0106365 | A1 | 4/2018 | Tsukizaki et al. |
| 2018/0149247 | A1 | 5/2018 | Rekow et al. |
| 2018/0172124 | A1 | 6/2018 | Valente et al. |
| 2018/0186230 | A1 | 7/2018 | Fukuda et al. |
| 2018/0236864 | A1 | 8/2018 | Imamura et al. |
| 2018/0238443 | A1 | 8/2018 | Aulin et al. |
| 2018/0244145 | A1 | 8/2018 | Ohnemus et al. |
| 2018/0298993 | A1 | 10/2018 | Fliearman et al. |
| 2019/0084555 | A1 | 3/2019 | Omura et al. |
| 2019/0160936 | A1 | 5/2019 | Lubben et al. |
| 2019/0176806 | A1 | 6/2019 | Trent |
| 2019/0219022 | A1 | 7/2019 | Patil et al. |
| 2019/0344655 | A1 | 11/2019 | Pettersson |
| 2019/0351751 | A1 | 11/2019 | Sato et al. |

FOREIGN PATENT DOCUMENTS

| | | | |
|---|---|---|---|
| DE | 000019927521 A1 | 6/2000 | |
| DE | 000019911924 A1 | 9/2000 | |
| DE | 000019923316 A1 | 11/2000 | |
| DE | 10003741 A1 | 4/2001 | |
| DE | 010007959 A1 | 8/2001 | |
| DE | 10103726 A1 | 8/2002 | |
| DE | 102006037576 A1 | 4/2008 | |
| DE | 102010030570 A1 | 12/2011 | |
| DE | 102010030571 A1 | 12/2011 | |
| DE | 102010060140 A1 | 4/2012 | |
| DE | 102011080068 A1 | 1/2013 | |
| DE | 102011089708 A1 | 6/2013 | |
| DE | 102011089709 A1 | 6/2013 | |
| DE | 102011089710 A1 | 6/2013 | |
| DE | 112011103973 T5 | 10/2013 | |
| DE | 102008045202 A1 | 3/2014 | |
| DE | 102013203009 A1 | 8/2014 | |
| DE | 102013012747 A1 | 9/2014 | |
| DE | 102013206970 A1 | 10/2014 | |
| DE | 102013209022 A1 | 11/2014 | |
| DE | 102014200720 A1 | 2/2015 | |
| DE | 102014200723 B3 | 2/2015 | |
| DE | 102013219948 | 4/2015 | |
| DE | 102017203026 A1 | 8/2017 | |
| DE | 102017204269 A1 | 9/2017 | |
| DE | 102020204705 A1 | 10/2020 | |
| DE | 102020204795 A1 | 10/2020 | |
| EP | 0384808 A1 | 9/1991 | |
| EP | 0645271 B1 | 3/1995 | |
| EP | 0391386 B1 | 9/1995 | |
| EP | 000002272702 A2 | 1/2011 | |
| EP | 2664785 | 11/2013 | |
| EP | 000001069310 B4 | 3/2014 | |
| GB | 0650564 | 2/1951 | |
| GB | 2506199 A | 3/2014 | |
| JP | 002015116004 A | 6/2015 | |
| WO | 1999023398 A2 | 5/1999 | |
| WO | 0188369 A1 | 11/2001 | |
| WO | 200700107458 A2 | 9/2007 | |
| WO | WO-2012078203 A1 * | 6/2012 | .......... F16H 3/728 |

OTHER PUBLICATIONS

Pending Utility U.S. Appl. No. 16/887,998, filed May 29, 2020.
USPTO non-final office action issued in pending Utility U.S. Appl. No. 16/385,860 dated Nov. 4, 2020.
USPTO Non-Final Office Action dated Jun. 19, 2020 for Utility U.S. Appl. No. 16/386,075.
German Search Report issued in German Application No. 102021113913.9 dated Sep. 30, 2021. (8 pages).
Deere & Company, Multi-Mode Integrated Starter-Generator Device With Electromagnetic Actuation Assembly, Utility U.S. Appl. No. 16/386,020, filed Apr. 16, 2019.
Deere & Company, Multi-Mode Integrated Starter-Generator Device With Transmission Assembly Mounting Arrangement, Utility U.S. Appl. No. 16/386,052, filed Apr. 16, 2019.
Deere & Company, Multi-Mode Integrated Starter-Generator Device With Solenoid Cam Actuation Apparatus, Utility U.S. Appl. No. 16/386,075, filed Apr. 16, 2019.
Deere & Company, Multi-Mode Integrated Starter-Generator Device With Preloaded Clutch, Utility U.S. Appl. No. 16/385,784, filed Apr. 16, 2019.
Deere & Company, Multi-Mode Integrated Starter-Generator Device, Utility U.S. Appl. No. 16/385,860, filed Apr. 16, 2019.
Deere & Company, Multi-Mode Integrated Starter-Generator Device With Preloaded Clutch, Utility U.S. Appl. No. 16/385,892, filed Apr. 16, 2019.
Deere & Company, Multi-Mode Integrated Starter-Generator Device With Magnetic Cam Assembly, Utility U.S. Appl. No. 16/385,934, filed Apr. 16, 2019.
Deere & Company, Multi-Mode Integrated Starter-Generator Device With Cam Arrangement, Utility U.S. Appl. No. 16/385,964, filed Apr. 16, 2019.
Deere & Company, Multi-Mode Integrated Starter-Generator Device With Dog Clutch Arrangement, Utility U.S. Appl. No. 16/385,989, filed Apr. 16, 2019.
Deere & Company, Multi-Mode Starter-Generator Device Transmission With Single Valve Control, Utility U.S. Appl. No. 16/386,001, filed Apr. 16, 2019.
NTN Automotive Sales Headquarters, Compact Clutch Integrated Pulley for Alternators, NTN Technical Review No. 75, 2007.
Harmonic Drive LLC, Harmonic Planetary Precision Gearing & Motion Control, Product Brochure, Mar. 2006.
Ioan-Adrian Viorel et al., Integrated Starter-Generators For Automotive Applications, Technical University of Cluj-Romania, Dept. of Electrical Machines, vol. 45, No. 3, 2004.
North Atalantic Starter, Starter Drives Explained, Northatlan.com, 2005.
German Search Report for application No. 1020172030267 dated Aug. 4, 2017.
German Search Report for application No. 1020182189080 dated May 27, 2019.
German Search Report for application No. 1020182214956 dated May 28, 2019.
German Search Report for application No. 1020182180784 dated Jun. 4, 2019.
USPTO Final Office Action dated Mar. 8, 2019 for Utility U.S. Appl. No. 15/056,767.
USPTO Final Office Action dated Jun. 11, 2018 for Utility U.S. Appl. No. 15/056,767.
USPTO Non-Final Office Action dated Sep. 9, 2019 for Utility U.S. Appl. No. 15/834,356.
USPTO Non-Final Office Action dated Nov. 2, 2017 for Utility U.S. Appl. No. 15/056,767.
USPTO Non-Final Office Action dated Sep. 28, 2018 for Utility U.S. Appl. No. 15/056,767.
USPTO Non-Final Office Action dated Nov. 1, 2018 for Utility U.S. Appl. No. 15/825,520.
USPTO Non-Final Office Action dated Feb. 25, 2019 for Utility U.S. Appl. No. 15/834,356.
USPTO Non-Final Office Action dated Mar. 4, 2020 for Utility U.S. Appl. No. 16/385,934.
Deere & Company, Utility U.S. Appl. No. 16/840,008, filed Apr. 3, 2020.
USPTO non-final office action issued in pending Utility U.S. Appl. No. 17/080,562 dated Dec. 6, 2021.

(56) References Cited

OTHER PUBLICATIONS

USPTO Non-Final Office Action dated Aug. 24, 2020 for Utility U.S. Appl. No. 16/385,964.
USPTO Non-Final Office Action dated Aug. 24, 2020 for Utility U.S. Appl. No. 16/385,784.
German Search Report issued in German Application No. 102020204642.5 dated Sep. 4, 2020. (8 pages).
German Search Report issued in German Application No. 102020204943.3 dated Sep. 4, 2020. (7 pages).
German Search Report issued in German Application No. 102020204704.9 dated Sep. 3, 2020. (7 pages).
German Search Report issued in German Application No. 102020203063.4 dated Sep. 4, 2020. (6 pages).
German Search Report issued in German Application No. 102020204646.8 dated Sep. 1, 2020. (6 pages).
German Search Report issued in German Application No. 102020204706.5 dated Sep. 3, 2020. (7 pages).
German Search Report issued in German Application No. 102020204795.2 dated Sep. 2, 2020. (7 pages).
German Search Report issued in German Application No. 102020204705.7 dated Sep. 1, 2020. (6 pages).
German Search Report issued in application No. DE102021113924.4 dated Sep. 30, 2021 (07 pages).
German Search Report issued in application No. DE 102021209339.6 dated Feb. 15, 2022 with translation, 17 pages.
USPTO Non-Final Office Action dated May 13, 2022 for Utility U.S. Appl. No. 17/185,713.

\* cited by examiner

BI-DIRECTIONAL MULTI-SPEED DRIVE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle drive systems, including drive arrangements for effecting multi-speed rotational outputs in either clock direction.

BACKGROUND OF THE DISCLOSURE

Work vehicles, such as those used in the agriculture, construction and forestry industries, and other conventional vehicles, may be powered by an internal combustion engine (e.g., a diesel engine) and/or one or more electric power sources (e.g., electric motors). Various drive arrangements may be employed in the vehicle to effect power transfer from the prime or secondary power sources. For example, the vehicle power and drive line may include one or more drive assemblies to effect one or more output speeds for operating certain vehicle components. For example, wheel end drives, final drives and the like may provide one or more gear ratios to transfer terminal or near terminal power to the tractive ground-engaging wheels or tracks of the vehicle. Efficient and smooth operation through the speed and torque ranges required of such drives is desirable.

SUMMARY OF THE DISCLOSURE

This disclosure provides a bi-directional multi-speed drive assembly such as may be used in work vehicles (e.g., as tractive wheel drives).

In one aspect, the disclosure provides a bi-directional drive assembly for a work vehicle. The drive assembly has a reaction member fixed with respect to or a part of a drive housing. A drive shaft is rotatable about a drive axis relative to the reaction member in a first rotation direction and alternatively a second rotation direction. A planetary set is coupled to the drive shaft and configured to rotate an output hub in the first rotation direction and alternatively the second rotation direction. A clutch assembly is coupled to the reaction member and includes a first clutch and a second clutch. The first clutch is configured to interface the planetary set with the reaction member to effect a first rotation speed of the output hub in the first rotation direction and alternatively the second rotation direction. The second clutch is configured to interface the planetary set with the reaction member to effect a second rotation speed of the output hub in the first rotation direction and alternatively the second rotation direction. An actuator arrangement is configured to effect movement of the first clutch and the second clutch along the drive axis to selectively engage the planetary set.

In another aspect, the disclosure provides a bi-directional drive assembly for a work vehicle. The drive assembly has a reaction member fixed with respect to or a part of a drive housing. A drove shaft is rotatable about a drive axis relative to the reaction member in a first rotation direction and a second rotation direction. A planetary set has a first-stage sun gear coupled to the drive shaft, a first-stage carrier, a second-stage sun gear coupled to the first-stage carrier, a second-stage carrier, and a ring gear coupled to an output hub to rotate in the first rotation direction or the second rotation direction. A clutch assembly is coupled to the reaction member and includes a first clutch and a second clutch. The first clutch is configured to interface the planetary set with the reaction member to effect a first rotation speed of the output hub in the second rotation direction. The second clutch is configured to interface the planetary set with the reaction member to effect a second rotation speed of the output hub in the second rotation direction. An actuator arrangement is configured to effect movement of the first clutch and the second clutch along the drive axis to selectively engage the planetary set The details of one or more embodiments are set forth in the accompanying drawings and the description below. Other features and advantages will become apparent from the description, the drawings and the claims.

BRIEF DESCRIPTION OF THE DRAWINGS

Like reference symbols in the various drawings indicate like elements.

DETAILED DESCRIPTION

Figure 1:
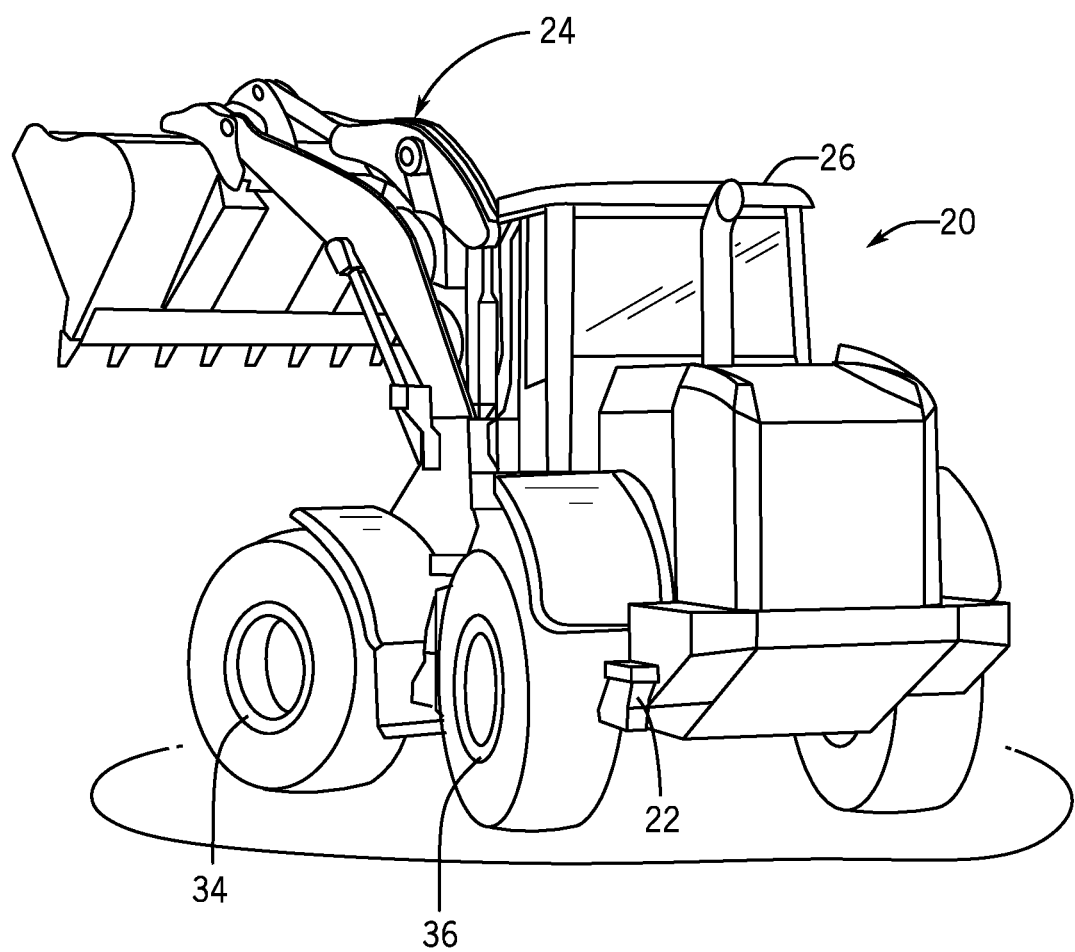
FIG. 1 is a schematic side view of an example work vehicle in the form of a wheel loader in which the disclosed bi-directional drive assembly may be employed.

The following describes one or more example embodiments of the disclosed bi-directional drive assembly, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "axial" refers to a dimension that is generally parallel to an axis of rotation, axis of symmetry, or centerline of a component or components. For example, in a cylinder or disc with a centerline and opposite, generally circular ends or faces, the "axial" dimension may refer to the dimension that generally extends in parallel to the centerline between the opposite ends or faces. In certain instances, the term "axial" may be utilized with respect to components that are not cylindrical (or otherwise radially symmetric). For example, the "axial" dimension for a rectangular housing containing a rotating shaft may be viewed as a dimension that is generally in parallel with the rotational axis of the shaft. Furthermore, the term "radially" as used herein may refer to a dimension or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial dimension. Additionally, the term "circumferential" may refer to a collective tangential dimension that is perpendicular to the radial and axial dimensions about an axis.

Overview

Generally, the disclosure provides a drive assembly that is selectively or alternatively operable in either rotational clock direction at the input and output sides of the drive assembly. Without changing internal or external components, the drive assembly may receive rotational input power and transmit rotational output power in either clock direction, as desired, using the drive signal to the power source (e.g., electric machine) to control output rotation direction. Multiple such drive assemblies with common internal and external hardware may thus be employed for oppositely facing shafts that are required to rotate in opposite clock directions to collectively effect one motion of the vehicle or subsystem thereof, such as to provide a tractive force in opposite clock directions to ground-engaging wheels or tracks at opposite sides of the vehicle to collectively propel the vehicle either in a forward or the rearward travel direction. In one example implementation, the bi-directional drive assembly may be employed in a common configuration for wheel end drive units for all wheels of the vehicle.

In certain embodiments, the bi-directional drive assembly is or includes a power transmission assembly with a gear set that is driven by a power source, such as one or more electric machines or hydraulic motors. The gear set transmits rotational power from the power source to a rotating output member. The output member may be an intermediate component or tied directly to the driven component. The gear set may effect a ratio change between the input power source and the output member, directly transmit the power without a change in ratio, or a combination thereof. The output member may thus rotate at the same speed as, or one or more different speeds than, the input power source or input shaft. The gear set may take any of various forms including arrangements with enmeshing spur or other gears as well as arrangements with one or more planetary gear sets. Large gear reduction ratios may be achieved by the drive assembly such that a single electric machine or hydraulic motor may be used and operated at suitable speeds for one or more speed and torque outputs. However, multiple electric machines or hydraulic motors may power the drive assembly.

Further, in certain embodiments, the bi-directional drive assembly may automatically and/or selectively shift gear ratios (i.e., shift between power flow paths having different gear ratios). The drive assembly may include one or more active engagement components that engage or disengage to effect power transmission through a power flow path. In this manner, bi-directional clutch configurations may be employed to carry out the ratio changes with appropriate control hardware and logic. In various embodiments, the clutches may be positive interlocking shifting type clutches, possibly referred to as "dog" clutches, in which raised features (e.g., axially extending projections) of the clutches engage and disengage corresponding raised features or move into and out of corresponding recesses in mating components of the gear set. In the case of male/female mating features, a reverse relationship may exist (e.g., the clutches define the recesses receiving raised projections of the gear set). Moreover, one or more clutches may serve to engage and disengage interlocking features of two or more components of a planetary set, such that one or more clutch components do not have interlocking features themselves.

In certain embodiments, the bi-directional drive assembly may include a clutch assembly with multiple clutches that selectively interface with a stationary reaction member or the drive assembly (e.g., a component fixed relative to or a part of a drive housing thereof). Selective engagement and disengagement of the clutches with a planetary set grounds one or more components thereof to effect one or more gear ratios and corresponding output rotation speeds and torques. The clutch assembly may be permanently coupled to the reaction member such that actuating components may be fixedly mounted to the drive assembly without the need for actuation of moving gear set components and the corresponding service lines (e.g., hydraulic passages or lines). Actuation components may also be mounted fixed relative to the reaction member to further reduce or eliminate service lines to non-stationary components. Selective engagement of the multiple clutches by the actuation components thereby allows the drive assembly to output multiple output speeds and torques.

In one example, the clutch assembly includes first and second clutches selectively actuated to engage a planetary set. Engagement of the first clutch grounds a component of the planetary set to effect a first gear ratio and output rotation speed and torque, and engagement of the second clutch grounds another component of the planetary set to effect a second gear ratio and output rotation speed and torque. The first and second rotation directions may be the same and be opposite that of a drive shaft though which rotational power from the power source is input into the system. In additional or alternative embodiments, the drive assembly may include a third clutch that engages the planetary set to effect a third gear ratio and output rotation speed and torque. Such a multi-speed drive assembly may thus effect three speeds by selectively grounding different components of the planetary set. In that case, the third rotation speed of an output hub may be greater than the second rotation speed of the output hub which may be greater than the first rotation speed of the output hub. In one or more implementations, one of the rotation speeds of the output hub (e.g., the third rotation speed) may match the rotation speed and direction of the drive shaft, thereby providing a direct drive mode with a 1:1 gear ratio.

In one or more further examples, the planetary set may be a compound planetary set including two stages having a first-stage sun gear coupled to the drive shaft, a first-stage carrier, a second-stage sun gear coupled to the first-stage carrier, a second-stage carrier, and a ring gear coupled to an output hub. The first clutch may engage the second-stage carrier to interface with the reaction member to effect the first rotation speed of the output hub in the second rotation direction. The second clutch may engage the second-stage sun gear to interface with the reaction member to effect the second rotation speed of the output hub in the second rotation direction. The third clutch may engage the first-stage sun gear to interface with the output hub (e.g., a cover of the planetary set), or another member coupled for co-rotation therewith, to effect the third rotation speed of the output hub in the first rotation direction.

The various clutches may have radial prongs or tabs for tying to actuation components of the drive assembly to move the clutches along the rotational drive axis. The third clutch may be implemented as a combination of a ring, with radial prongs or tabs for tying to actuation components, that effects sliding of a sleeve splined to the first-stage sun gear, which thereby may be slid along the drive axis. The third clutch may be considered a ring that engages the planetary set indirectly through the sleeve, or it may be considered a ring and sleeve assembly that directly engages the gear set. Still further, the third clutch may be considered to include a ring, a sleeve and a gear component (e.g., a sun gear) that has interlocking features that engage another part of the planetary set. In an example embodiment, the third clutch is spring applied, while the first and second clutches may be spring returned and may include a thrust washer or thrust bearing to transmit power flow between the ring and the sleeve when actuated.

In certain embodiments, the actuation arrangement includes a number of electromechanical or electromagnetic solenoids (that convert electrical energy into a mechanical linear push and/or pull force) that function to engage and/or disengage the clutches. Armatures of the solenoids are connected via linkages (e.g., levers and pins) to the clutches to shift the clutches between engaged and disengaged positions relative to the planetary set. For example, the plurality of solenoids may include: one or more (e.g., two) first solenoids each with a first armature, and one or more first linkage assemblies each with a first actuation pin coupled to the first clutch and with a first link member extending between the first armature and the first actuation pin; one or more (e.g., two) second solenoids each with a second armature, and one or more second linkage assemblies each with a second actuation pin coupled to the second clutch and with a second link member extending between the second armature and the second actuation pin; and one or more (e.g., three) third solenoids each with a third armature, and one or more third linkage assemblies each with a third actuation pin coupled to the third clutch and with a third link member extending between the third armature and the third actuation pin. Actuation of the first solenoid(s) may move each first armature and first link member to shift each first actuation pin and the first clutch along the drive axis to engage the planetary set. Actuation of the second solenoid(s) may move each second armature and second link member to shift each second actuation pin and the second clutch along the drive axis to engage the planetary set. Actuation of the third solenoid(s) moves each third armature and third link member to shift each third actuation pin and the third clutch along the drive axis to disengage the output hub. In this implementation, the first and second clutches are solenoid actuated (e.g., via push actuation of each armature) to engage the planetary set and spring returned, and the third clutch is spring actuated to engage the planetary set (or output hub thereof) and returned by actuation (e.g., via pull actuation of each armature) of the corresponding solenoid(s). Other implementations are encompassed by this disclosure.

As used herein with respect to the solenoids, the term "activated" or "energized" refers to a command that results in the associated solenoid moving its armature by the application of electromagnetic force. In one example, an energize command for the solenoids results in the respective armatures being pushed out of or pulled into the solenoids, which may occur from applying a current to a coil within the solenoid to push or pull the armature out of/into the solenoid. It is also possible to operate the solenoids by discontinuing current to the coil such that a spring pushes/pulls the armature relative to the solenoid coil.

The bi-directional drive assembly disclosed herein may be useful for any number of work or conventional vehicle applications. In the work vehicle context, the drive assembly may power various sub-systems including various aspects of the power and drive trains of the vehicle. As one example, the drive assembly may be or be incorporated into a wheel drive for providing tractive power to the ground-engaging wheels or tracks of the vehicle. The drive assembly may be incorporated into the power and drive train at an intermediate location between the wheels/tracks and the prime mover or transmission, or it may be at the wheel/track ends (e.g., one at each ground-engaging wheel or track) in which case the drive assembly may be considered a "final drive" that couples directly or through a downstream gearset to the wheel or track carrying hub. In such a case when the drive assembly is remote from the prime mover, a secondary power source, such as one or more electric machines or hydraulic motors provide the immediate power input to the drive assembly.

The following describes one or more example implementations of the disclosed bi-directional drive assembly. Discussion herein may sometimes focus on the example application of a wheel end drive assembly of a wheel loader, but the disclosed drive assembly is suitable for other types of components and work vehicles, including various other construction machines (e.g., crawlers, motor graders, dump trucks) as well as various agriculture or forestry machines (e.g., combines, harvesters, balers, mowers, forwarders, forestry skidders and so on) and utility vehicles.

Example(s) of Bi-Directional Multi-Speed Drive

Referring to FIG. 1, in some embodiments, the disclosed work vehicle 20 may be a wheel loader although, as noted, the bi-directional drive assembly described herein may be applicable to a variety of machines. As shown, the work vehicle 20 may be considered to include a structural main frame or chassis 22 supporting a work implement 24 that is selectively positioned by various combinations of structural elements (e.g., arms, crossbars, pivot joints, etc.) and controllably moved utilizing any number of actuators, such as hydraulic cylinders. The work vehicle 20 may further be considered to include an operator cabin 26, a power and drive train 28, a control system 30, and a hydraulic system 32. The work vehicle 20 may be supported off the ground by ground-engaging wheels or tracks. In the illustrated example, the work vehicle 20 includes a front axle with steerable front wheels 34 (one at each left/right lateral side of the work vehicle 20) and a rear axle with non-steerable rear wheels 36 (one or more at each left/right side of the work vehicle 20).

Figure 2A:
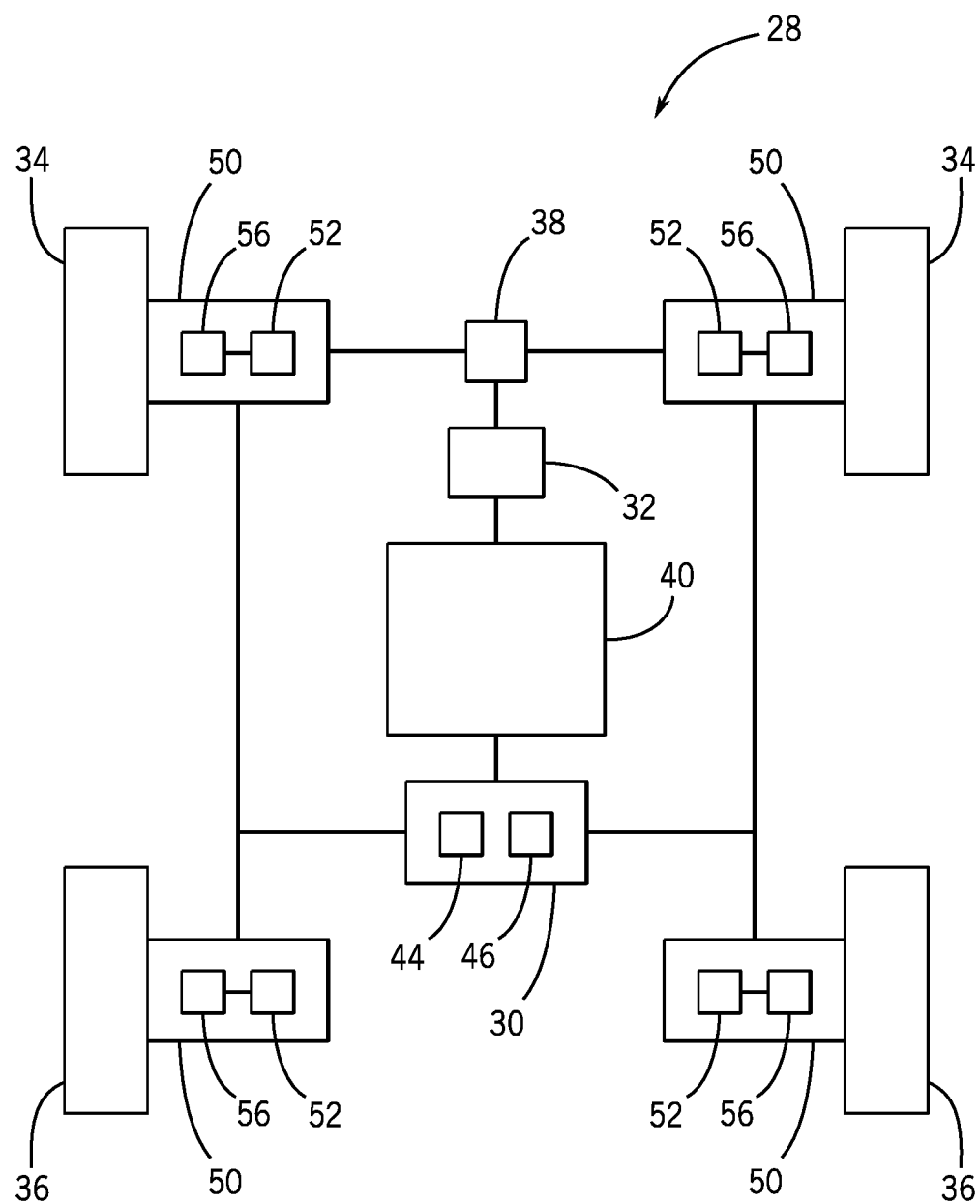
FIG. 2A is a schematic diagram of certain components of a power and drive train for the example work vehicle of FIG. 1.

Referring also to FIG. 2A, the power and drive train 28 has wheel steering components 38, including various devices (e.g., power steering pumps and lines, steering mechanisms, and the like) that couple manual (e.g., operator steering controls or wheel) and/or automated (via the control system 30) steering input to the wheels, such as the steerable wheels 34. The power and drive train 28 includes a prime mover, such as an engine 40, which supplies power to the work vehicle 20, as either direct mechanical power or after being converted to electric or hydraulic power. In one example, the engine 40 is an internal combustion engine, such as a diesel engine, having an engine shaft for outputting mechanical power. The engine 40 is controlled by an engine control module (not shown) of the control system 30. It should be noted that the use of an internal combustion engine is merely an example, as the prime power source may one or more fuel cells, electric motors, hybrid-gas electric motors, or other power-producing devices.

The engine 40 provides power to onboard mechanical, electrical and hydraulic subsystems of the work vehicle 20 governing such things as tractive power to propel the work vehicle 20 and for off-boarding power to other sub-systems remote from the work vehicle 20. For example, the engine 40 may provide mechanical power that is converted to an electric format to run the electronics of the control system 30 and one or more electric drives of the work vehicle 20. The control system 30 thus may have mechanical to electrical power conversion components 44, one or more batteries 46, and associated electronics, including various alternators, generators, voltage regulators, rectifiers, inverters, and the like. The control system 30 may be configured as a computing device or electronic control unit (ECU) with associated processor devices and memory architectures, as a hard-wired computing circuit (or circuits), as a programmable circuit, as a hydraulic, electrical, or electro-hydraulic controller.

The control system 30 may be configured to execute various computational and control functionality with respect to the work vehicle 20, including various devices associated with the power and drive train 28, the hydraulic system 32, and various additional components of the work vehicle 20. In some embodiments, the control system 30 may be configured to receive input signals in various formats (e.g., as hydraulic signals, voltage signals, current signals, and so on), and to output command signals in various formats (e.g., as hydraulic signals, voltage signals, current signals, mechanical movements such as rotation, and so on). The control system 30 is configured to operate various aspects of the disclosed drive assembly, including electromechanical actuators (e.g., solenoids), which may form part of the power and drive train 28 or part of another subsystem of the work vehicle 20.

In some embodiments, the control system 30 may include or be configured to receive input commands from, or otherwise interface with, a human-machine interface or operator interface (not shown) and various sensors, units, and systems onboard or remote from the work vehicle 20. In response, the control system 30 may generate one or more types of commands for implementation by various systems of the work vehicle 20. The control system 30 may additionally or alternatively operate autonomously without input from a human operator, communicating with other systems or devices (including other controllers) in various known ways, including via a CAN bus (not shown), via wireless or hydraulic communication means, or otherwise. In one example and as discussed in greater detail below, the control system 30 may command current to electromagnets associated with an actuator assembly to engage and/or disengage clutches within the drive assembly.

The engine 40 may also provide mechanical power that is converted to hydraulic format to power various hydraulic drives, pumps and compressors that pressurize fluid to drive various actuators of the hydraulic system 32 in order to power components of the work vehicle 20, such as the work implement 24, wheel steering and braking, a tow-behind work implement (not shown), or the like. In this example, the work vehicle 20 supports the mounting of the work implement 24 as a loader with linkage boom arms and a bucket that may be raised and lowered during operation by one or more hydraulic piston-cylinder devices. The hydraulic system 32 may be coupled to and operated by the control system 30 autonomously or in response to commands from an operator input device (e.g., operator controls, operator display device, etc.) in the cabin 26 or remote from the work vehicle 20. The hydraulic system 32 may include other components (e.g., valves, flow lines, pistons/cylinders, seals/gaskets, and so on), such that control of various devices may be effected with, and based upon, hydraulic, mechanical, or other signals and movements.

As noted above, the bi-directional drive assembly of this disclosure may be implemented in various subsystems within the work vehicle context and may be powered in one or more formats. The following describes one example bi-directional drive assembly implemented as, and incorporated within, an electric wheel end drive 50. One such wheel end drive 50 is installed just upstream from each of the four wheels 34, 36 of the work vehicle 20. Each wheel end drive 50 itself, or one or more components thereof, may thus be considered a "final" drive due to its location proximate the associated wheel 34, 36 and its functioning to provide the last or nearly last gear ratio for the associated wheel 34, 36. The wheel end drives 50 may differ at each or pairs (e.g., front and rear) of the wheels 34, 36. However, due to the bi-directional functionality of the drive assembly, the wheel end drives 50 are identical for all wheels 34, 36, and as such, only one will be detailed below. Moreover, while the example wheel end drive 50 is electric, it may be operated by a different input power format (e.g., hydraulic or mechanical). The example wheel end drive 50 is also described herein as having multiple (e.g., two) electric machines for input power. However, the wheel end drive 50 may be operated with one or more than two electric machines. In the former case, intermediate input gearing may be utilized or omitted depending on the operating parameters (e.g., speed and torque) of the electric machine and/or the drive assembly itself and the wheels 34, 36. As will be described, intermediate input gearing is used to couple power to the drive assembly when two or more electric machines are employed. Additionally, the example wheel end drive 50 is a multiple-mode drive operable to output multiple speed and torque ranges for tractive power to the wheels 34, 36. Thus, while the engine 40 supplies prime power for the electric machine(s), the wheel end drives 50 are the direct power (and speed and torque) influencers to the wheels 34, 36, such that a central range transmission, axles or other upstream speed- and torque-changing gearing may be, and in the example implementation is, omitted from the work vehicle 20.

Figure 2B:
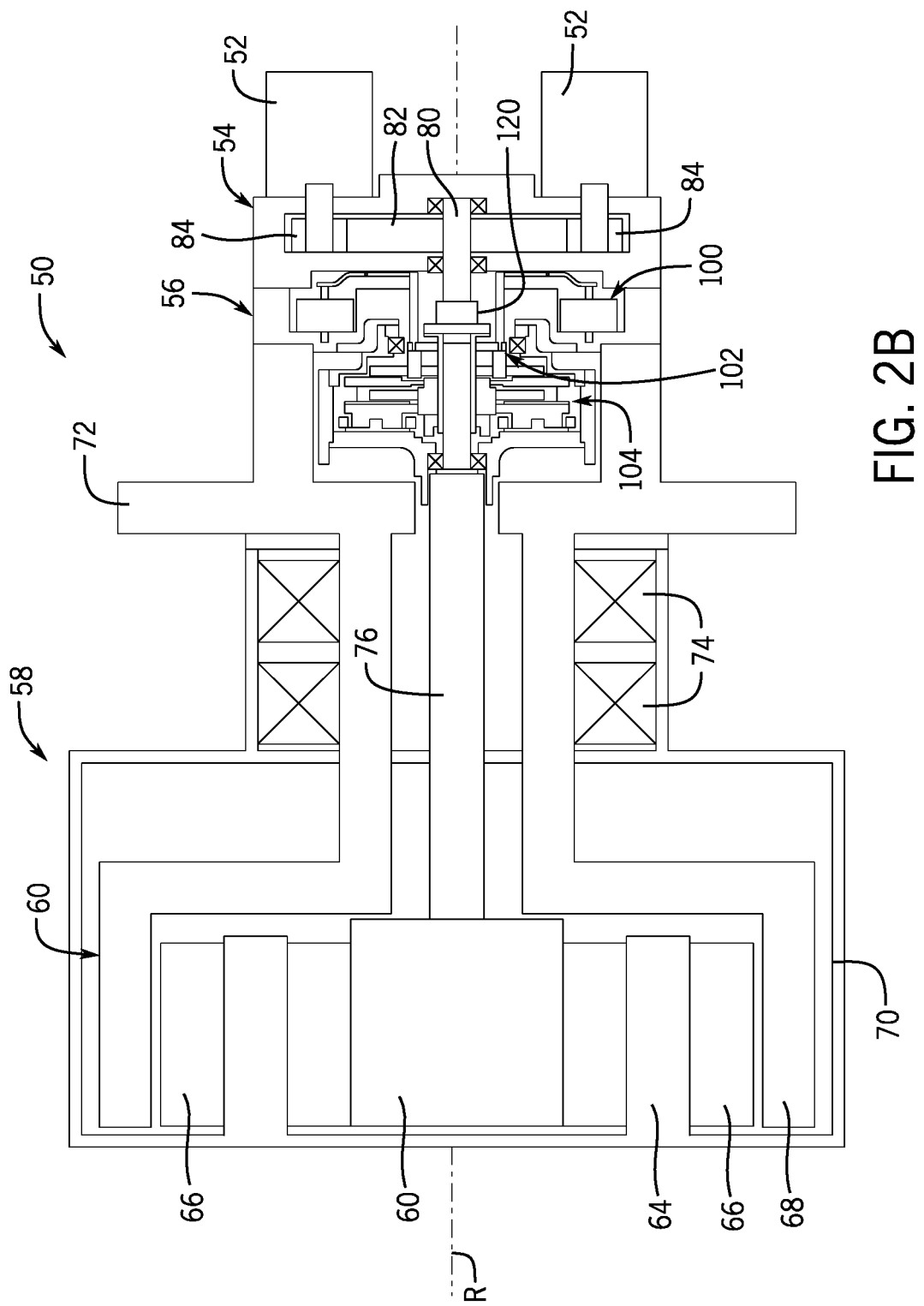
FIG. 2B is a schematic diagram of an example wheel end drive implementation of the disclosed drive assembly that may be incorporated in the example work vehicle of FIG. 1.
Figure 3:
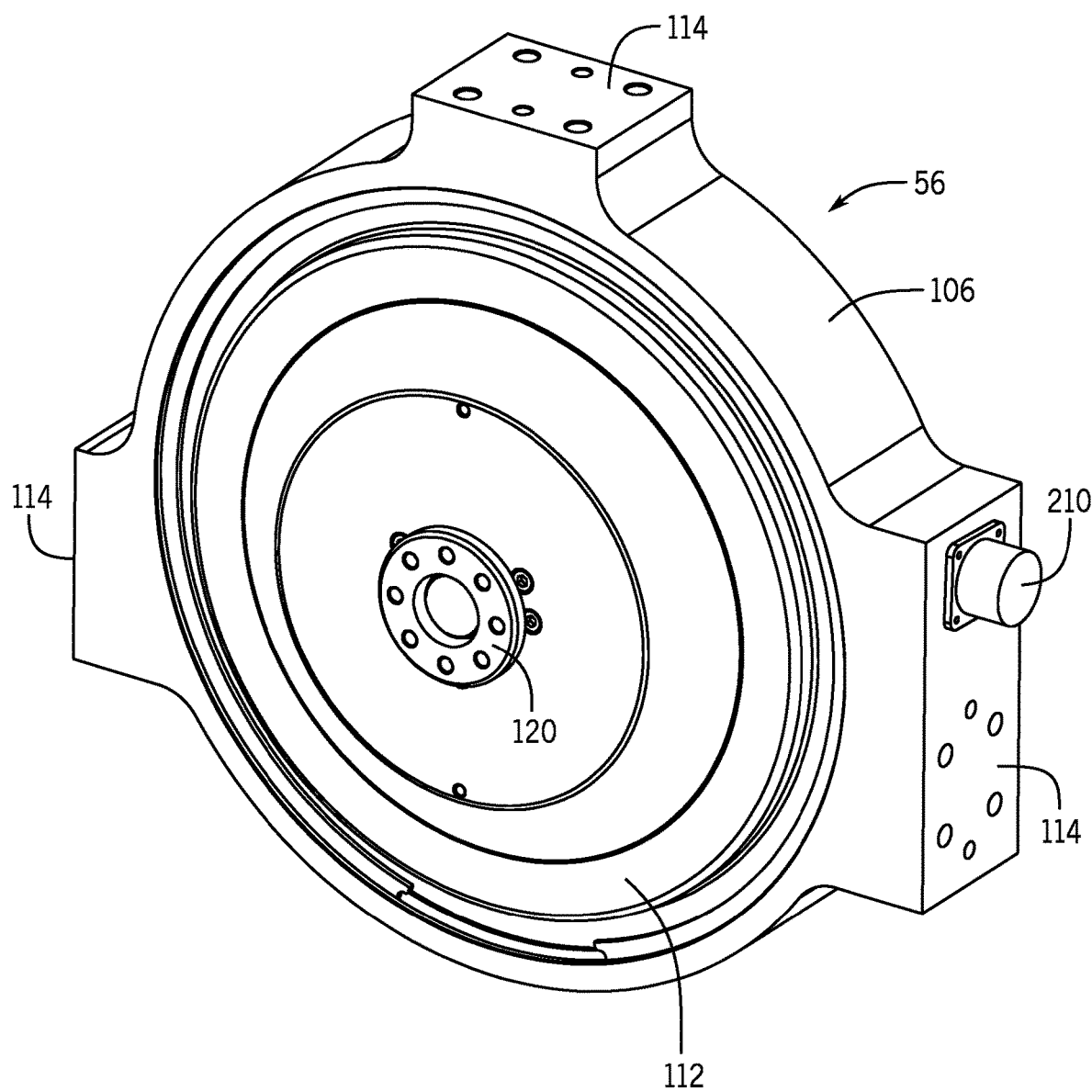
FIG. 3 is an isometric view of an example bi-directional drive assembly.
Figure 4:
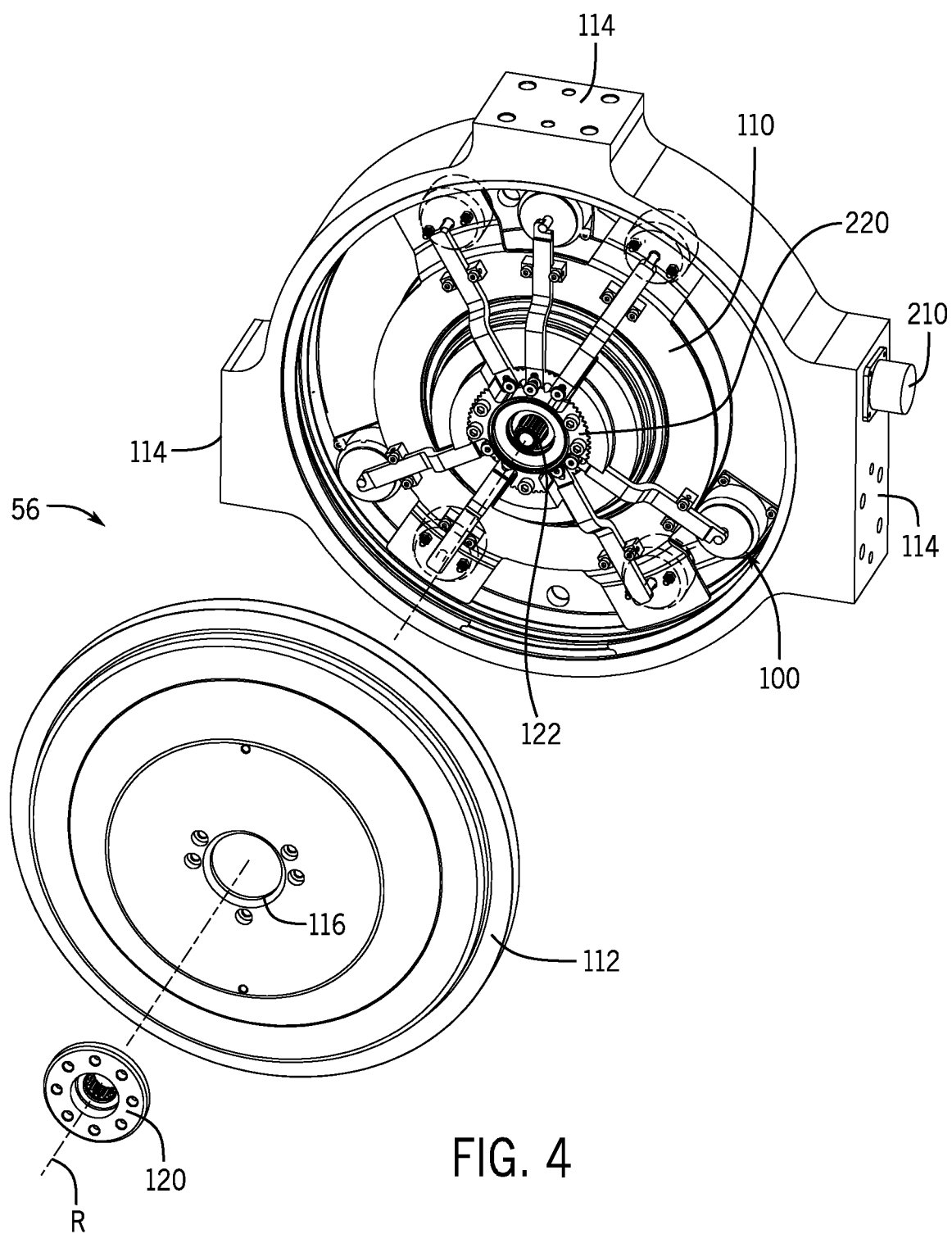
FIG. 4 is a partially exploded assembly view thereof.

Referring also to FIG. 2B, the example wheel end drive 50 includes as principal components the input power sources in the form of two electric machines 52 which couple via an input gear set 54 to a bi-directional drive assembly 56, which in turns couples to and drives one of the wheels 34, 36 via an outboard wheel end 58. The outboard wheel end 58 may be configured in any way suitable to mount the associated wheel 34, 36. Depending on speed and torque requirements of the wheel end drive 50, the outboard wheel end 58 may contain an outboard gear set, such as a single stage planetary set 60 having a sun gear 62 and a carrier 64 that supports planet gears 66 that mesh with a ring gear 68. The carrier 64 may be fixed to a wheel hub (not shown) of the associated wheel 34, 36 directly, or the carrier 64 may be contained within an outboard wheel end housing 70 that couples to the wheel hub. The ring gear 68 may be fixed to or formed integral with a mounting flange 72. The example outboard gear set 60 is a sun-in, carrier out planetary arrangement, although various other configurations are envisioned, including the omission of an outboard gear set or the carrier and/or the outboard wheel end housing 70 being formed by or directly coupled to the wheel hub of the wheel 34, 36. The wheel end drive 50 is assembled to the vehicle chassis 22, such as by the mounting flange 72, in a fixed orientation in the case of the rear wheels 36 or pivotally, about an upright, generally vertical or vertically canted, steering axis (not shown), in the case of the steered front wheels 34. One or more wheel bearings 74 allow the carrier 64 and/or outboard wheel end housing 70 to rotate relative to the vehicle chassis 22 about a generally lateral, or side to side, fixed or pivotal drive or rotation axis R. The outboard wheel end 58 rotates about the rotation axis R under power output from the drive assembly 56 via output shaft 76 coupled to or formed integrally with the sun gear 62 of the outboard planetary set 60. The drive assembly 56 is powered through an input shaft 80 splined to a central input gear 82, which meshes with relatively small diameter shaft gears 84 rotated by the electric machines 52. As noted, the input side of the wheel end drive 50 may be implemented in various ways, including with a different input gear set (e.g., a different axial gear set or a single or double stage planetary set), by a single electric machine with or without an input gear set (e.g., direct shaft mounting of the electric machine to the drive assembly), by more than two electric machines with a modified input gear set of any suitable axial, planetary or other gear configuration, and by a power source of a different format (e.g., mechanical or hydraulic). The input side as well as the outboard wheel end 58 of the wheel end drive 50 may be configured as needed to provide a 1:1 or other gear ratio between the electric machines 52 and the drive assembly 56 and between the drive assembly 56 and the wheel hub as needed depending, at least in part, on the desired speed and torque at the wheel 34, 36 and the speed and torque capacity of the electric machines 52.

Referring now also to FIGS. 3-6, the following details the example bi-directional drive assembly 56 of the wheel end drive 50. The example drive assembly 56 is a three-speed drive including one direct drive mode, in which a 1:1 gear ratio is achieved through which the input and output speeds and torques match, and two other modes in which gear ratios are achieved to effect different output speeds and torques relative to the input power. The example drive assembly 56 effects low, mid and high modes. The high mode is the direct drive mode and has a higher speed and lower torque than the mid mode, which has a higher speed and lower torque than the low mode.

The drive assembly 56 includes an actuator arrangement 100, a clutch assembly 102 and a gear set in the form of planetary set 104 all of which is contained within a drive housing 106. The drive assembly 56 operates to transfer power (rotational speed and torque) from the electric machines 52 to the outboard wheel end 58 at each wheel 34, 36 at multiple gear ratios that are selected based on the status of the clutch assembly 102, which is controlled by the actuator arrangement 100 based on signals from the control system 30.

The drive housing 106, and components of the drive assembly 56 fixed thereto, are stationary in that they are fixed axially and radially with respect to the rotation axis R, such that at least in the case of the rear (non-steered wheels) the drive housing 106 is fixed relative to the work vehicle chassis 22. The drive housing 106, and certain fixed components, may serve as reaction members against which certain forces effected by non-fixed components of the drive assembly 56 are applied. In the example drive assembly 56, the drive housing 106, or a hub portion thereof, forms a reaction member against which reaction forces from the clutch assembly 102 apply directly, as detailed below, and the drive housing 106, via a support plate 110 fixed to the drive housing 106, serves as a reaction member for the actuator arrangement 100, as also detailed below. Thus, the drive housing 106, or hub thereof, itself is considered a "reaction member" as used herein for its direct and indirect backstop of applied forces. In other implementations, forces may be applied to the drive housing 106 only indirectly, in which case the drive housing may still be considered a reaction member. In still other implementations, only a component of the drive assembly 56 to which forces are applied directly may be considered a reaction member.

In the depicted example, the drive housing 106 supports a cover 112 and has mounting areas 114 to which may attached mounting arms (not shown) that connect the drive housing 106 to another component of the wheel end drive 50, such as the mounting flange 72, the outboard wheel end housing 70, or the housing for the input gear set 54. As shown, the cover 112 includes an aperture 116 that enables a shaft coupler 120 to rotationally join (e.g., by teeth or splines) the input shaft 80 (FIG. 3) to a drive shaft 122 of the drive assembly 56 that has toothed or splined ends 123, 125 supported for rotation by one or more bearings 126.

Figure 7:
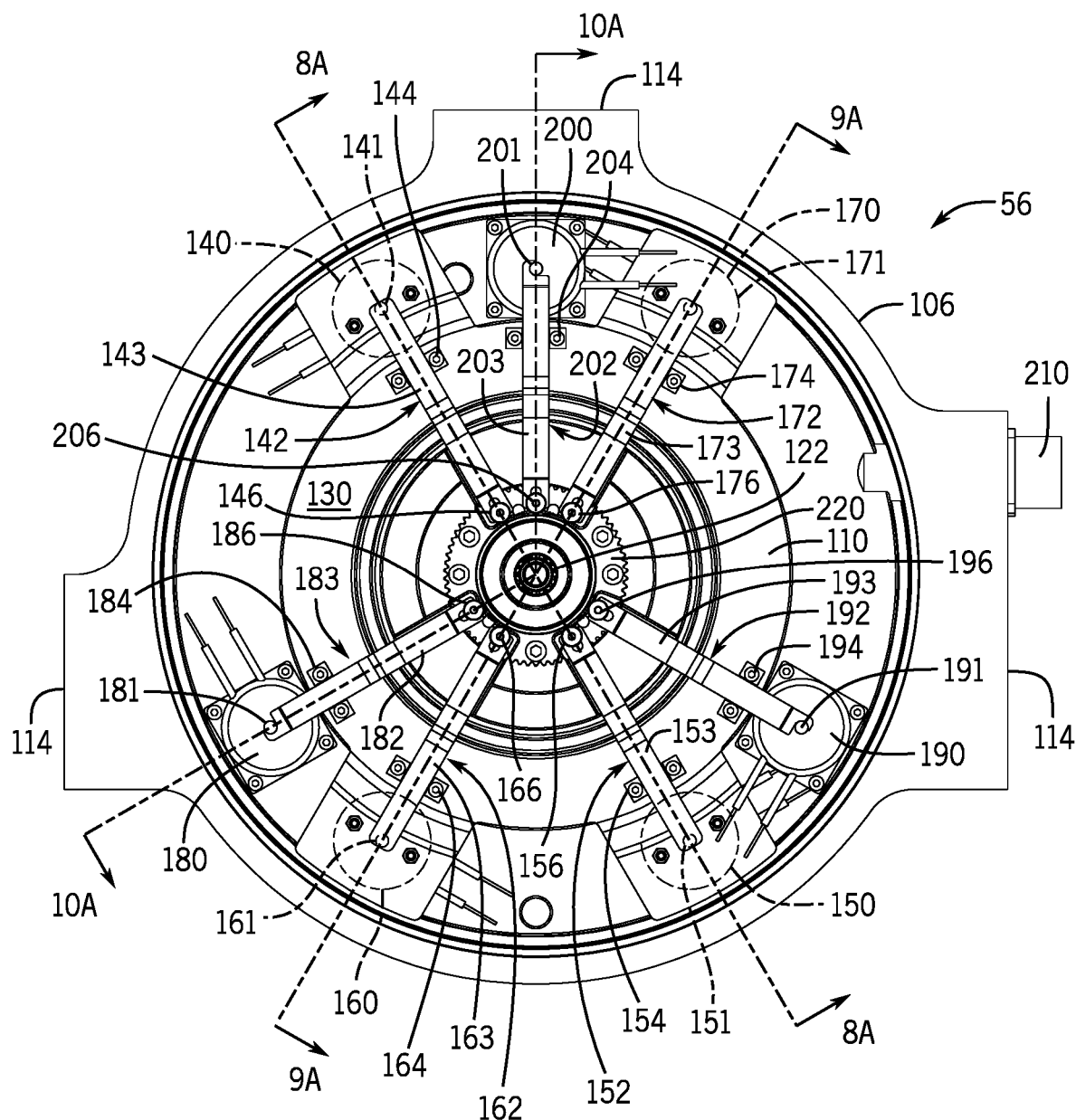
FIG. 7 is an end view of the drive assembly showing the actuator arrangement.

Referring also to FIG. 7, the actuator arrangement 100 is supported by the support plate 110, which in the depicted example is formed as a ring structure with opposite first and second side faces 130, 132, with its inner periphery defining an open center to accommodate the connection of the input gear set 54, and thereby the electric machines 52, to the clutch assembly 102 and planetary set 104. The actuator arrangement 100 includes a number of solenoids that interact with the clutch arrangement 102 and mount to the support plate 110 at flanges that extend radially outward from the ring portion of the support plate 110. The support plate 110 is fixed to the drive housing 106 (e.g., by threaded fasteners, locking ring, etc.) such that the support plate 110 and drive housing 106 together serve as the reaction member for the solenoids 140, 150, 160, 170, 180, 190, 200.

As described in greater detail below, the example bi-directional drive assembly 56 includes one or more first (or low) solenoids, one or more second (or mid) solenoids, and one or more third (or high) solenoids. In the depicted example, the actuator arrangement 100 includes two first clutch solenoids 140, 150, two second clutch solenoids 160, 170, and three third clutch solenoids 180, 190, 200, although other examples may have different numbers of solenoids. The solenoids 140-200 are electromagnetic actuators that generate linear movement of a respective armature 141, 151, 161, 171, 181, 191, 201 by manipulating an induced magnetic field in a wire coil (not shown) within the solenoids 140-200. Electrical power is coupled to the solenoids 140-200 via connector 210 that enables commands and/or power between the respective solenoids 140-200, the control system 30 and/or other sources. Various connection elements may allow for wired or wireless connections. Positioning the solenoids 140-200 around the outer periphery of the support plate 110 may facilitate wire routing, if applicable, between the controller and the electrical features of the solenoids 140-200.

Double-acting solenoids that operate in two alternative axial directions when energized may be used. However, the example drive assembly 56 uses single-acting or one-way solenoids that are energized to move the armature in one direction against a spring force, which moves the armature in the opposite direction when the solenoids are deenergized. The example drive assembly 56 uses solenoids configured as push-type solenoids (that magnetically extend the armature when energized) and pull-type solenoids (that magnetically retract the armature when energized). In particular, the four first and second solenoids 140-170 are push-type solenoids, and the three third solenoids 180-200 are pull-type solenoids. All of the solenoids 140-200 are relatively low profile devices that enable a low overall profile for the drive assembly 56. The quantity, type and size of the solenoids employed may vary in other implementations.

Each of the solenoids 140-200 is coupled to the clutch assembly 102 via a linkage assembly 142, 152, 162, 172, 182, 192, 202 that includes a link member 143, 153, 163, 173, 183, 193, 203 and a pivot member 144, 154, 164, 174, 184, 194, 204. Specifically, each linkage assembly 142-202 extends between the respective solenoid device 140-200 and an actuation pin 146, 156, 166, 176, 186, 196, 206. As described below, the actuation pins 146-206 are axially repositionable to move components of the clutch assembly 102 along the rotation axis R between engaged and disengaged positions to modify the power transfer characteristics of the planetary set 104. The actuation pins 146-206 may be supported by, and move within, a stationary spindle or hub 220 that circumscribes the drive shaft 122. The hub 220 may be a unitary part of the drive housing 106, or it may be a separate part that is fixed to the drive housing 106, such as by upstream teeth or splines 222 in the outer periphery of the hub 220 that mate with teeth or splines at the inner periphery of a central opening in the drive housing 106, as in the described example. In any case, the hub 220 is stationary, neither rotating about nor translating along the rotation axis R. The hub 220 has two open-ended recessed cavities 224, 226. The cavity 224 is sized and configured to contain one or more bearings 228 for supporting the drive shaft 122 for rotation about the rotation axis R. The cavity 226 is sized and configured to support the clutch assembly 102 and contain and/or engage certain features thereof, as described below.

Figure 8A:
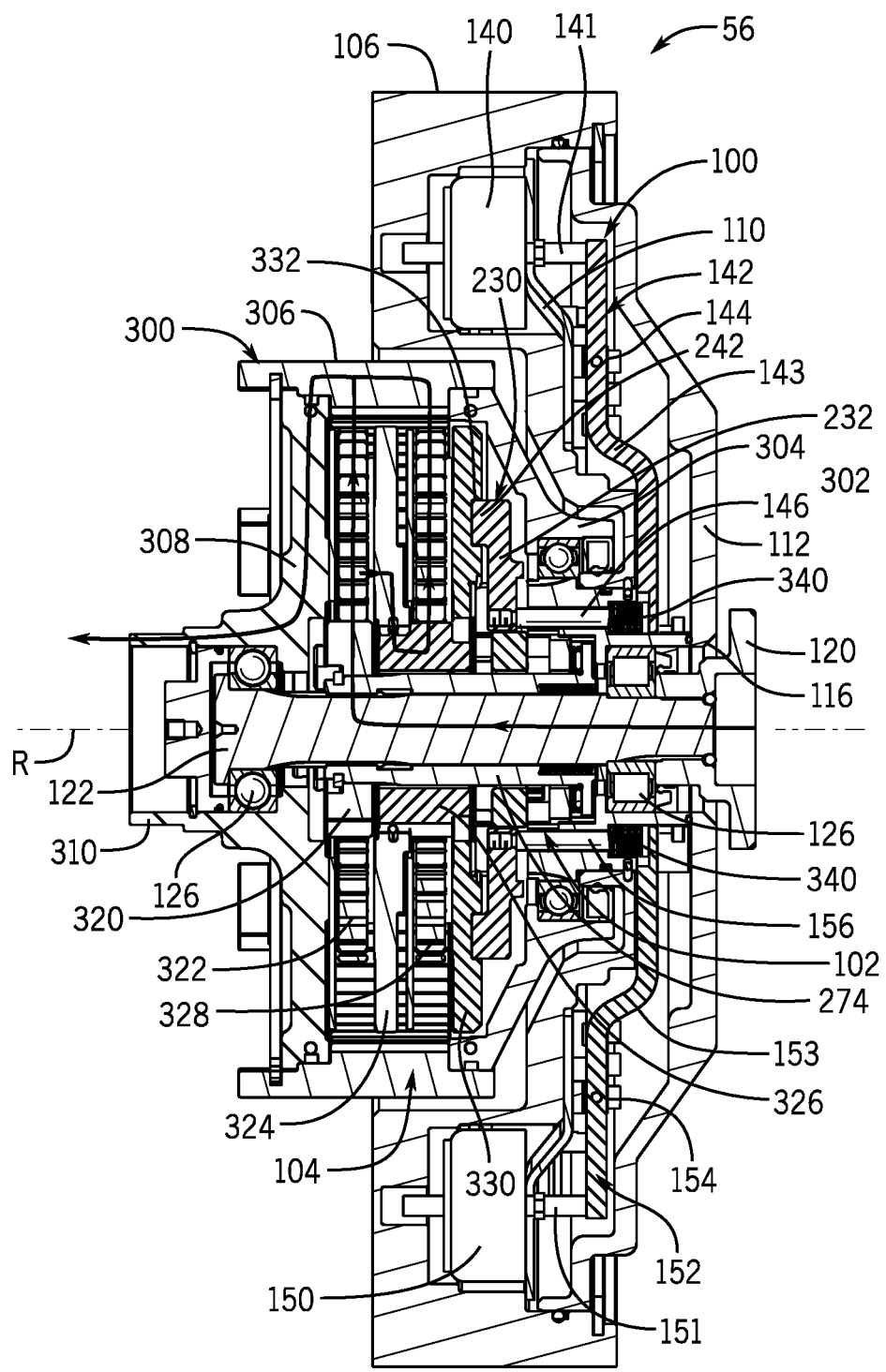
FIGS. 8A and 8B are cross-sectional views of the drive assembly taken along plane 8A-8A of FIG. 7 and depicting the drive assembly in respective engaged and disengaged conditions of a first drive mode.

Regarding actuation for the first (e.g., low) mode, FIG. 8A depicts the solenoids 140, 150 mounted to the drive housing 106 via the support plate 110 and coupled to the actuation pins 146, 156 via linkage assemblies 142, 152 to control a first clutch 230 of the clutch assembly 102. As described in greater detail below, the first clutch 230 is repositionable to translate along, but not rotate about, the rotation axis R between an engaged position and a disengaged position relative to the planetary set 104 to modify the power transfer through the planetary set 104. In this example, the solenoids 140, 150 are mounted to the second side face 132 of the support plate 110. The link members 143, 153 extend between the armatures 141, 151 and the actuation pins 146, 156 and are pivotable about the pivot members 144, 154 mounted to or formed in the support plate 110. As a result of the armatures 141, 151 being pushed out of the solenoids 140, 150, the link members 143, 153 are pivoted to move the first clutch 230 in the opposite axial direction (e.g., toward the planetary set 104). The arrangement of the linkage assemblies 142, 152 enables the solenoids 140, 150 to use leverage with the support plate 110 (acting as a reaction member) to facilitate operation in a more compact and efficient manner, for example, by enabling advantageous use of beneficial lever ratios as a function of travel and force.

Figure 5:
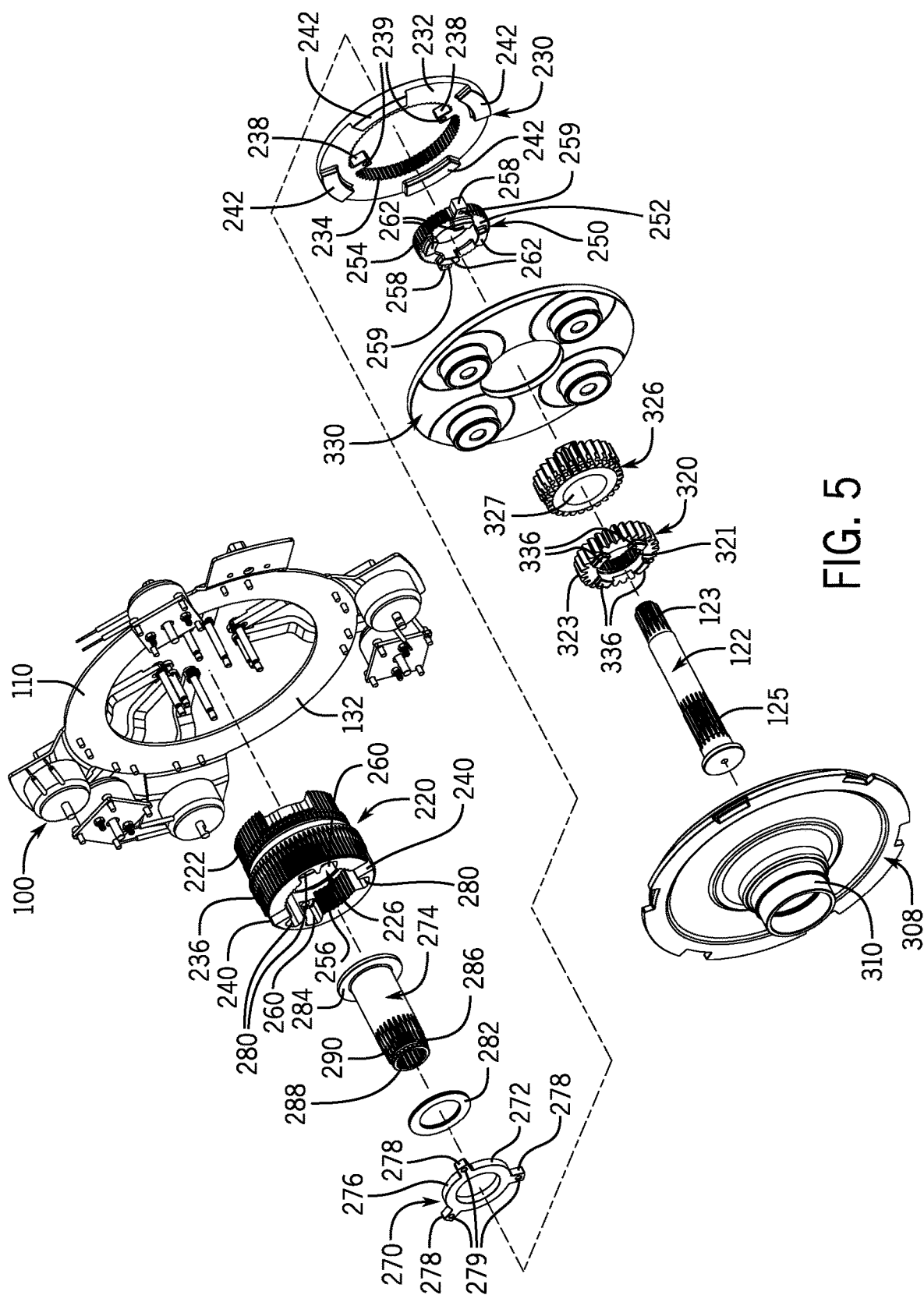
FIGS. 5 and 6 are front and rear exploded assembly views thereof showing a clutch assembly and actuator arrangement with certain components of the drive assembly omitted for clarity.
Figure 6:
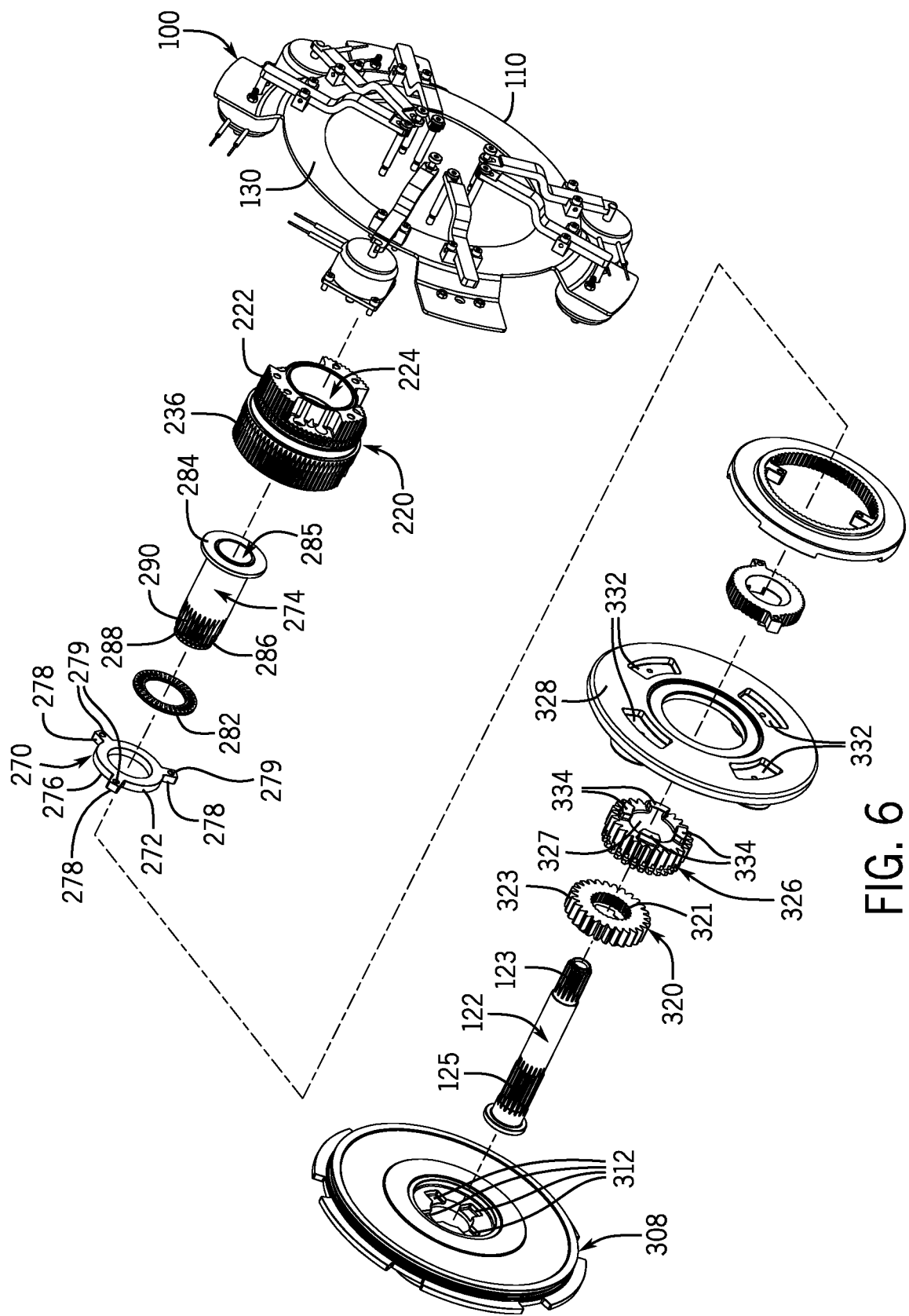
Figure 8B:
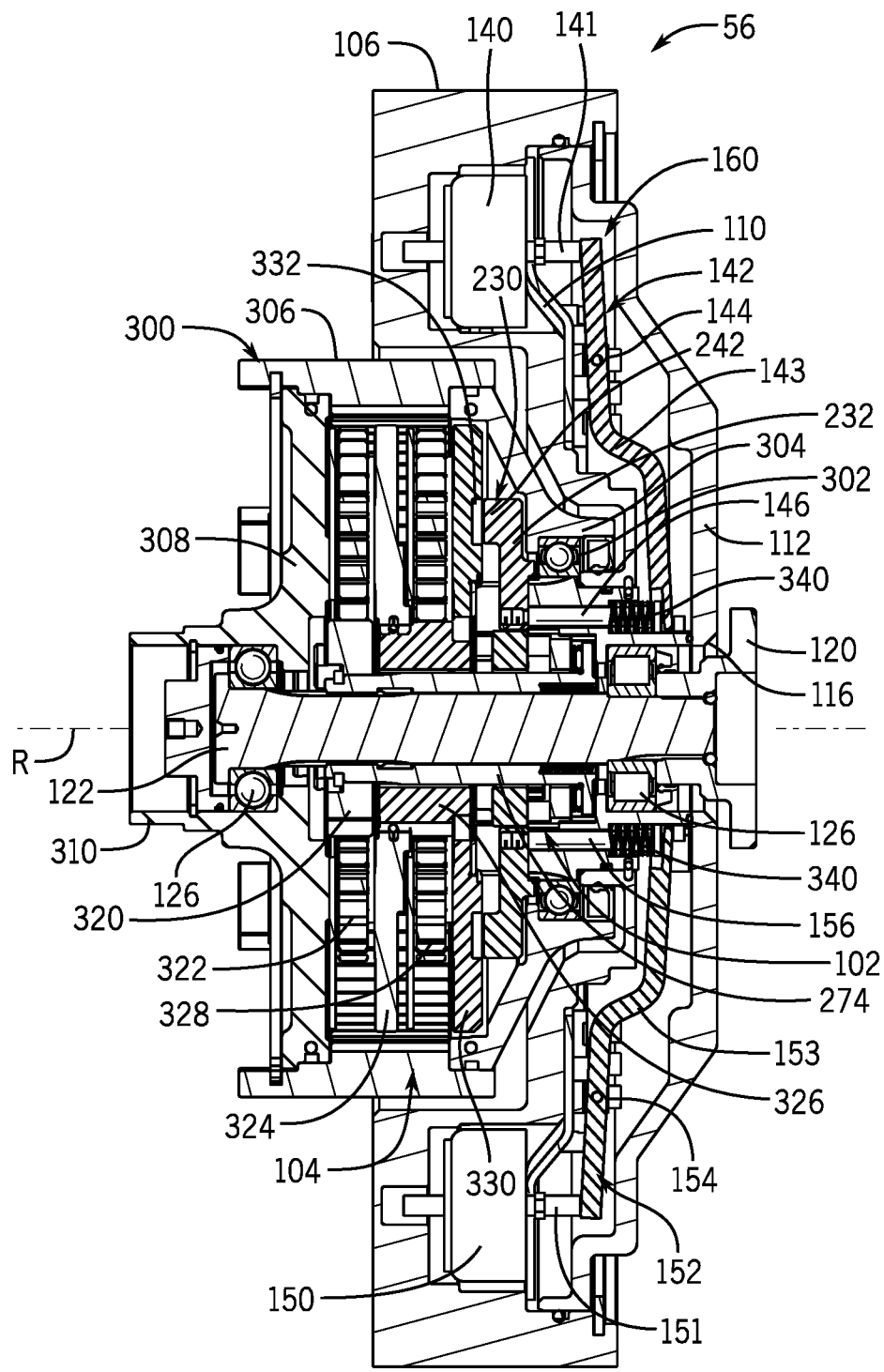

As shown in FIGS. 5 and 6, the first clutch 230 includes an annular ring 232 with a toothed or splined inner periphery 234 sized and configured to engage a toothed or splined outer periphery 236 of the hub 220. A pair of prongs or tabs 238 spaced apart 180 degrees extend radially inward from the inner periphery 236 and define pin mounting holes 239 that receive the actuation pins 146, 156. In particular, the actuation pins 146, 156 are secured to the ring 232 at the tabs 238 such that axial movement of the actuation pins 146, 156 by the solenoids 140, 150 functions to axially reposition the first clutch 230. Rotation of the annular ring 232 about the rotation axis R is prevented by engagement of the tabs 238 in outward-opening pockets 240 in the hub 220 which open at the inner end of the hub 220 as well as portions of the outer periphery 236 thereof. As shown in FIGS. 8A and 8B discussed in greater detail below, the annular ring 232 additionally includes one or features (e.g., projections (or "dogs") 242 or corresponding recesses for receiving such dogs) at its downstream face to engage an element of the planetary set 104.

Figure 9A:
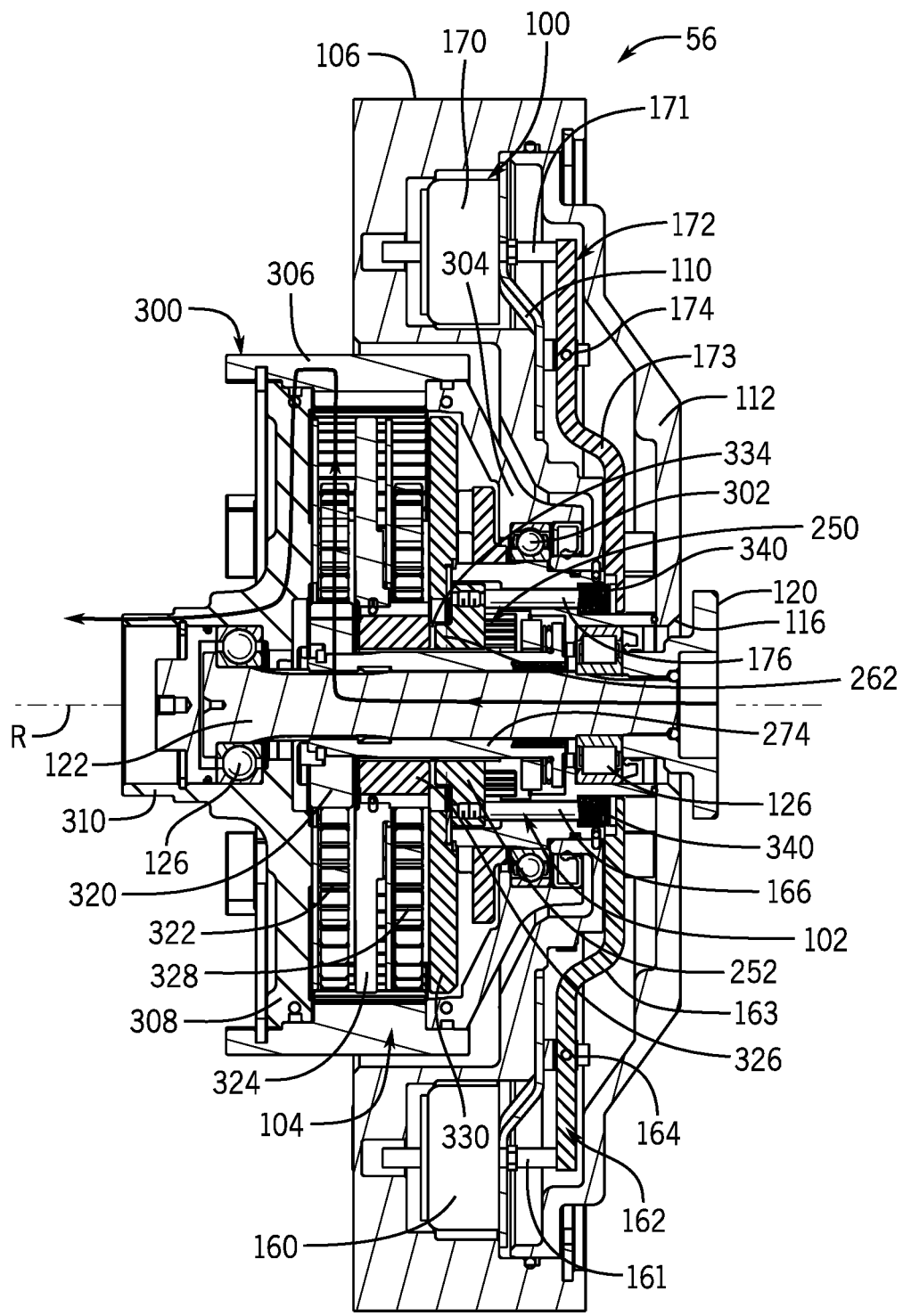
FIGS. 9A and 9B are cross-sectional views of the drive assembly similar to FIGS. 8A and 8B albeit taken along plane 9A-9A of FIG. 7 and depicting the drive assembly in respective engaged and disengaged conditions of a second drive mode.

Regarding actuation for the second (e.g., mid) mode, FIG. 9A depicts the solenoids 160, 170 mounted to the drive housing 106 via the support plate 110 and coupled to the actuation pins 166, 176 via linkage assemblies 162, 172 to control a second clutch 250 of the clutch assembly 102. As described in greater detail below, the second clutch 250 is repositionable to translate along, but not rotate about, the rotation axis R between an engaged position and a disengaged position relative to the planetary set 104 to modify the power transfer through the planetary set 104. In this example, the solenoids 160, 170 are mounted to the second side face 132 of the support plate 110. The link members 163, 173 extend between the armatures 161, 171 and the actuation pins 166, 176 and are pivotable about the pivot members 164, 174 mounted to or formed in the support plate 110. As a result of the armatures 161, 171 being pushed out of the solenoids 160, 170, the link members 163, 173 are pivoted to move the second clutch 230 in the opposite axial direction (e.g., toward the planetary set 104). As with the first mode, the arrangement of the linkage assemblies 162, 172 enables the solenoids 160, 170 to use leverage with the support plate 110 (acting as a reaction member) to facilitate operation in a more compact and efficient manner, for example, by enabling advantageous use of beneficial lever ratios as a function of travel and force.

Figure 9B:
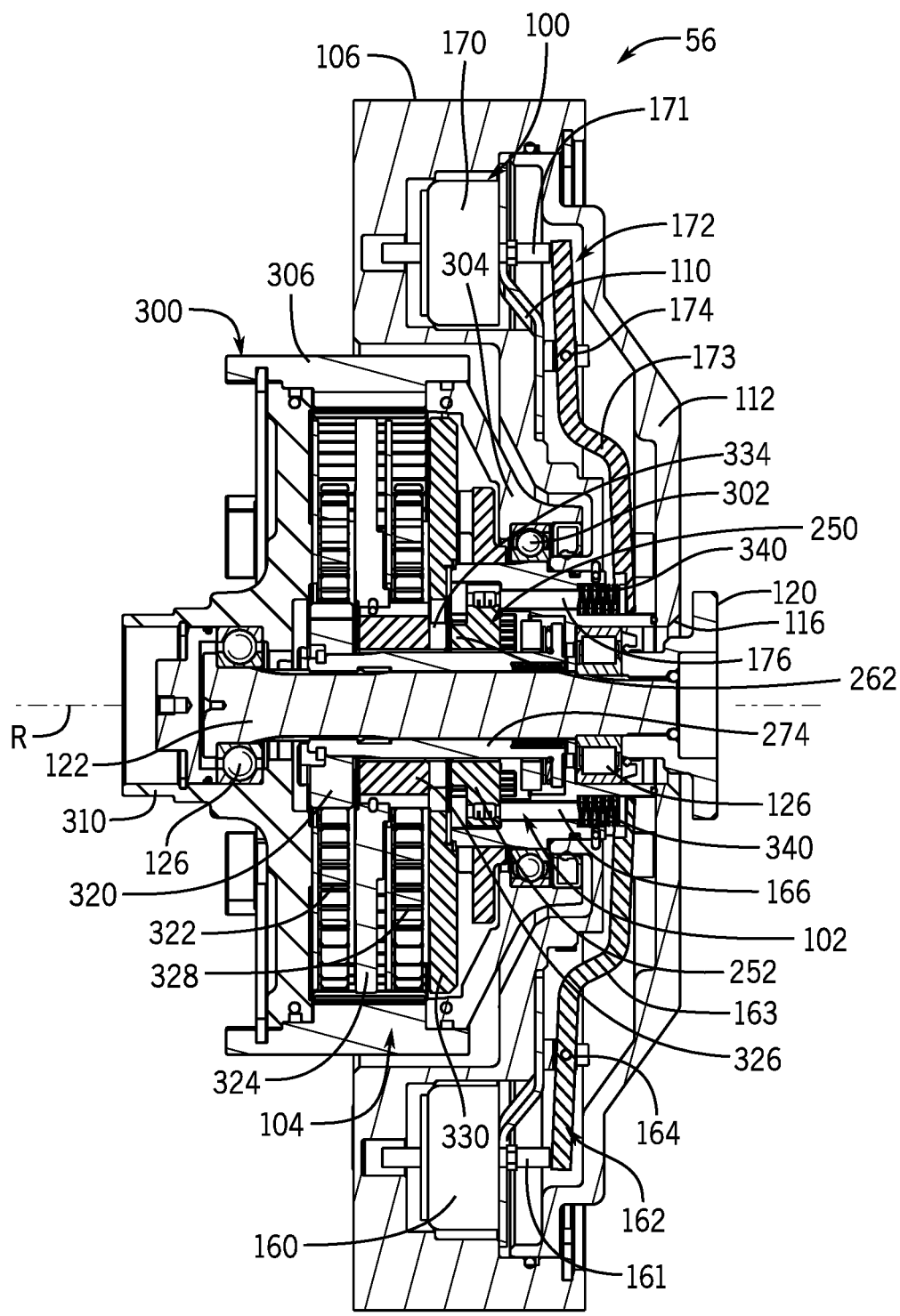

Referring again to FIGS. 5 and 6, the second clutch 250 includes an annular ring 252 with a toothed or splined outer periphery 254 sized and configured to engage a toothed or splined inner periphery 256 of the hub 220. A pair of prongs or tabs 258 spaced apart 180 degrees extend radially outward from the outer periphery 254 and define pin mounting holes 259 that receive the actuation pins 166, 176. In particular, the actuation pins 166, 176 are secured to the ring 252 at the tabs 258 such that axial movement of the actuation pins 166, 176 by the solenoids 160, 170 functions to axially reposition the second clutch 250. Rotation of the annular ring 252 about the rotation axis R is prevented by engagement of the tabs 258 in inward-opening pockets 260 in the hub 220 which open at the inner end of the hub 220 as well as portions of the inner periphery 256 thereof. As shown in FIGS. 9A and 9B discussed in greater detail below, the annular ring 252 additionally includes one or features (e.g., projections/dogs 262 or corresponding recesses for receiving such dogs) at its downstream face to engage an element of the planetary set 104.

Figure 10A:
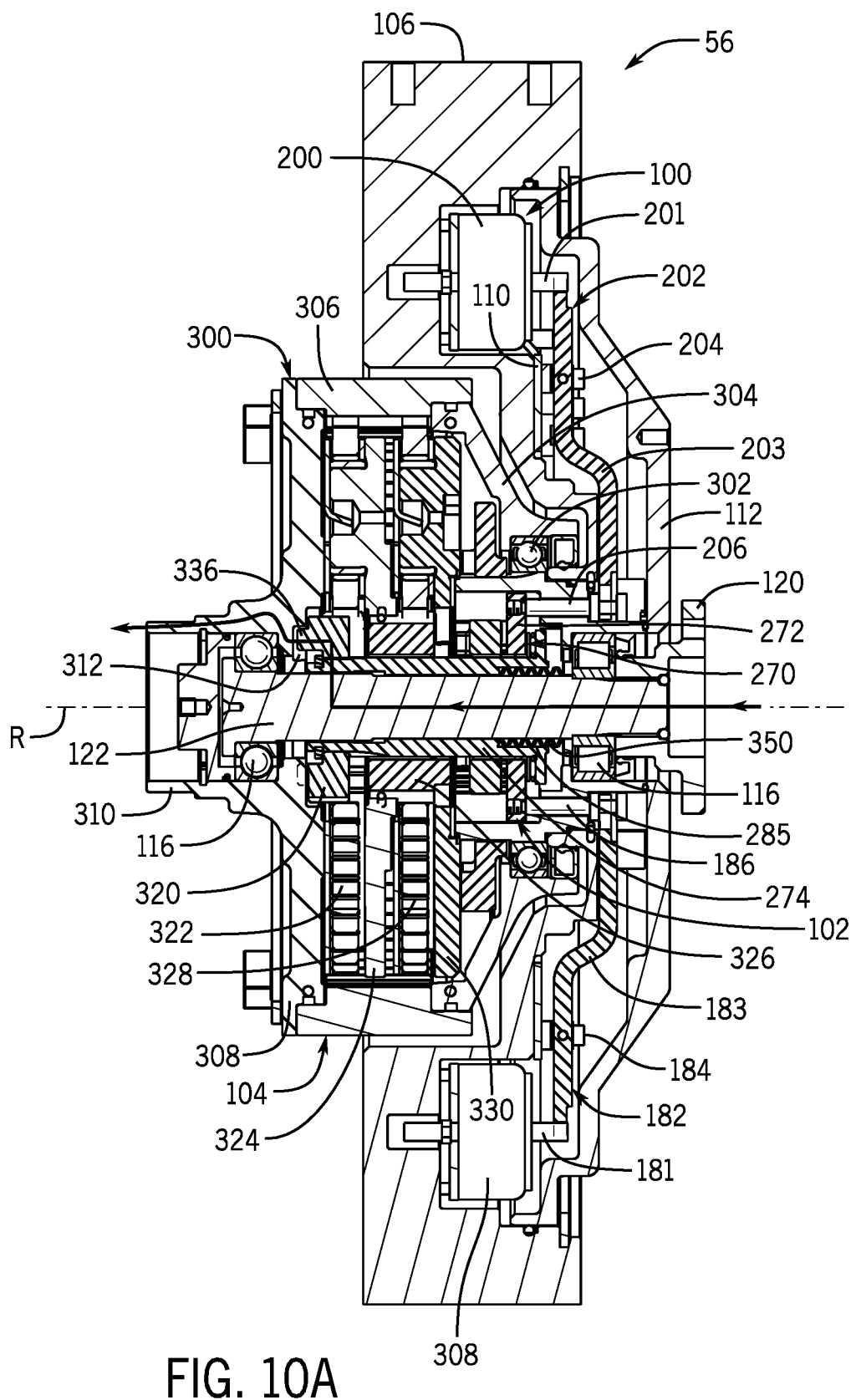
FIGS. 10A and 10B are cross-sectional views of the drive assembly similar to FIGS. 8A and 8B albeit taken along angled section 10A-10A of FIG. 7 and depicting the drive assembly in respective engaged and disengaged conditions of a third drive mode.

Regarding actuation for the third (e.g., high) mode, FIG. 10A depicts the solenoids 180, 200 (solenoid 190 is shown in FIGS. 5-7) mounted to the drive housing 106 via the support plate 110 and coupled to the actuation pins 186, 206 (and 196) via linkage assemblies 182, 202 (and 192) to control a third clutch 270 of the clutch assembly 102. As described in greater detail below, the third clutch 270 is repositionable to translate along, but not rotate about, the rotation axis R between an engaged position and a disengaged position relative to the planetary set 104 to modify the power transfer through the planetary set 104. In this example, the solenoids 180, 200 (and 190) are mounted to the first side face 130 of the support plate 110. The link members 183, 203 (and 193) extend between the armatures 181, 201 (and 191) and the actuation pins 186, 206 (196) and are pivotable about the pivot members 184, 204 (and 194) mounted to or formed in the support plate 110. As a result of the armatures 181, 201 being pulled into of the solenoids 180, 200 (and 190), the link members 183, 203 (and 193) are pivoted to move the third clutch 270 in the same axial direction (e.g., toward the planetary set 104).

Figure 10B:
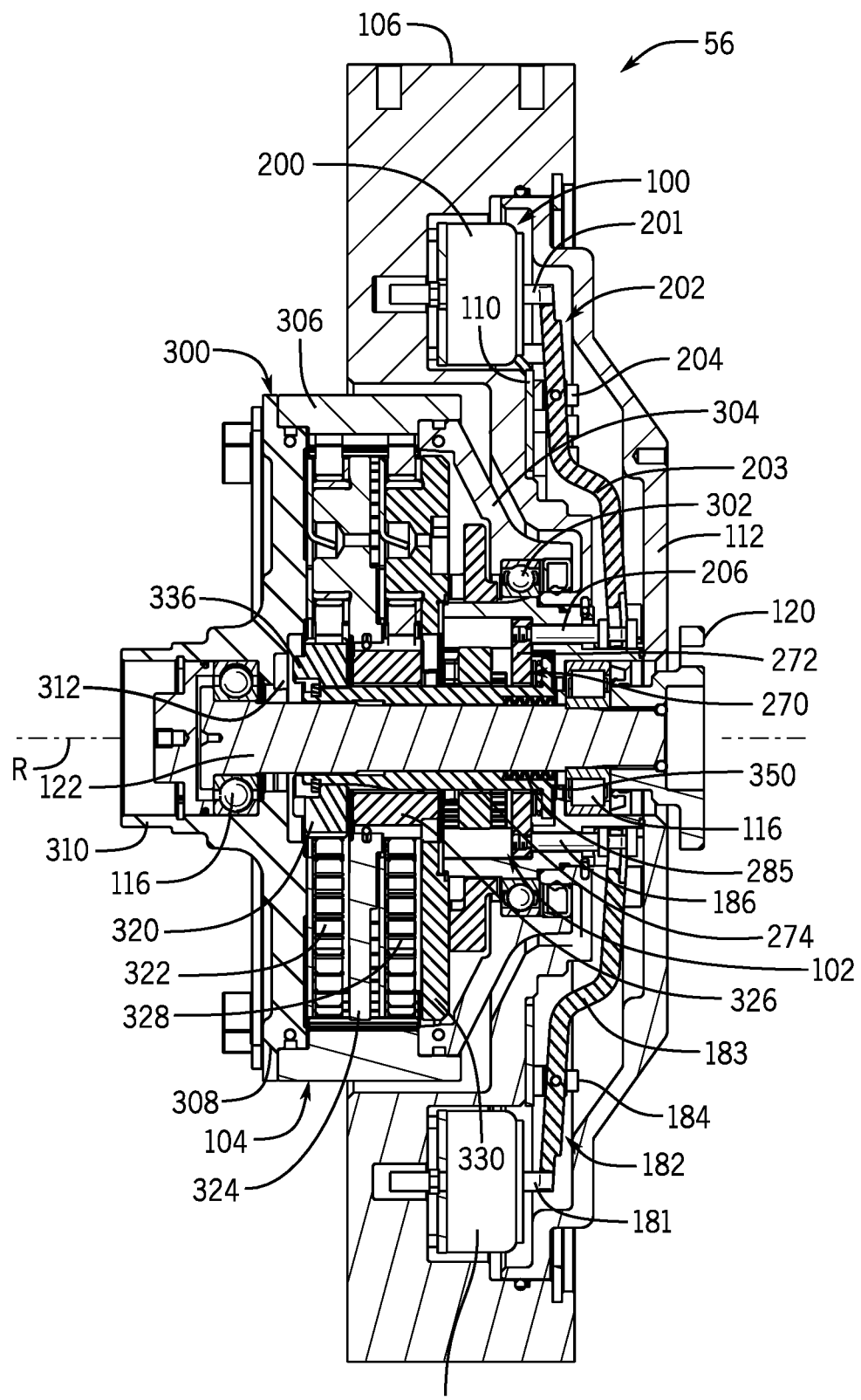

Referring again to FIGS. 5 and 6, the third clutch 270 includes an annular ring 272 without toothed or splined inner and outer peripheries. Three prongs or tabs 278 spaced apart 120 degrees extend radially outward from an outer periphery 276 and define pin mounting holes 279 that receive the actuation pins 186, 196, 206. In particular, the actuation pins 186, 196, 206 are secured to the ring 272 at the tabs 278 such that axial movement of the actuation pins 186, 196, 206 by the solenoids 180, 190, 200 functions to axially reposition the third clutch 270. Rotation of the annular ring 272 about the rotation axis R is prevented by engagement of the tabs 278 in inward-opening pockets 290 in the hub 220 which open at the inner end of the hub 220 as well as portions of the inner periphery 256 thereof. The ring 272 translates an annular sleeve 274, for example, by acting through a thrust bearing or washer 282 on a flanged end 284 of the sleeve 274. As shown in FIGS. 10A and 10B discussed in greater detail below, the sleeve 274 additionally includes one or more features (e.g., an end 286 with teeth or splines at inner 288 and outer 290 peripheries opposite the flanged end 284) to engage an element of the planetary set 104.

Although the drive assembly 56 may be implemented in other arrangements, as shown in the drawings, the clutches 230, 250, 270 may be concentric about the rotation axis R and sized such that the ring 232 of the first clutch 230 is disposed about the rings 252, 272 of the second and third clutches 250, 270, both of which may fit concentrically within the open cavity 226 of the hub 220 of the drive housing 106. Further, the ring 252 of the second clutch 250 may be disposed along the rotation axis R to, at least in part, align radially with the ring 232 of the first clutch 230. Other arrangements may be provided. Additional details regarding the operation of the clutches 230, 250, 270, particularly regarding their selective interfacing of the planetary set 104 with the drive housing 106 (reaction member) are provided below.

As introduced above, the planetary set 104 of the drive assembly 56 is configured to transfer power between the electric machine(s) 52 in one or more gear ratios. The example planetary set 104 is a two-stage or compound planetary set, although other planetary configurations are possible. The planetary set 104 is generally contained within a gear housing 300, portions of which, in this example, rotate with certain components of the planetary set 104. One or more bearings 302 may rotatably mount the gear housing 300 to enable rotation of the gear housing 300 relative to the stationary drive housing 106. Specifically, the gear housing 300 may comprise a housing hub 304 rotatably mounted to the drive housing hub 220 of the drive housing 106. The housing hub 302 is fixed to a ring gear 306 of the planetary set 104 and thereby to a housing cover 308. The housing cover 308 defines an output hub 310 at its downstream side that is configured to couple to the outboard wheel end 58, and thereby the associated wheel 34, 36, and the housing cover 308 defines one or more features 312 (e.g., dog recesses or projections) at its upstream side that allows the housing cover 308 to be coupled to power, as described below. The gear housing hub 304, the ring gear 306 and the housing cover 308 may thus rotate as a unit about the rotation axis R. As noted above, the drive shaft 122 may be directly connected to an electric machine 52, or to a gear shaft (such as input shaft 80) of the input gear set 54. In the depicted example, the drive shaft 122 is coupled for co-rotation with the input shaft 80 via the shaft coupler 120. In any case, the drive shaft 122 lies along and rotates about the axis of rotation R, and thus provides the rotational input to the planetary set 104.

The planetary set 104 includes an annular first-stage sun gear 320 mounted for rotation about the rotation axis R by the drive shaft 122. The first-stage sun gear 320 has an inner periphery 321 with teeth or splines that mesh with teeth or splines at the outer periphery 323 at the end 286 of the sleeve 274 for the third clutch 270. The sleeve 274 is mounted for co-rotation with the drive shaft 122 by engagement of the teeth or splines at the end 125 of the drive shaft 122 and the inner periphery 288 of the sleeve 274. A set of first-stage planet gears 322 circumscribe the first-stage sun gear 320. In one example, the first-stage planet gears 322 include a single circumferential row of three planet gears 322, although other embodiments may include axial or radially stacked rows, each with an odd number of planet gears in the radial direction. The first-stage planet gears 322 are supported for rotation on axles or pinions of a first-stage carrier 324, which circumscribes the first-stage sun gear 320, as well as the drive shaft 122 and the sleeve 274. The first-stage carrier 324 has a toothed or splined inner periphery, which cooperates with a second-stage sun gear 326, as described below. Each of the planet gears 322 may rotate about individual pinion axes of rotation, and the first-stage carrier 324, when rotatable, enables the set of first-stage planet gears 322 to collectively revolve about the first-stage sun gear 320. The first-stage planet gears 322 also mesh with the teeth at the inner periphery of the ring gear 306. In the illustrated example, the ring gear 306 forms a part of the gear housing 300, as noted above. However, in some embodiments, the ring gear 306 may be housed within an annular cover that is either stationary or rotates about the rotation axis R. In such a case, the ring gear 306 may still join the housing hub 304 and housing cover 308 to rotate therewith and may further be connected to such an annular cover provided such cover is free to rotate.

The second-stage sun gear 326 is annular with a smooth (non-toothed or splined) inner periphery 327 circumscribing the sleeve 274 and the drive shaft 122. As noted, the inner periphery of the first-stage carrier 324 is in constant toothed or splined engagement with the second-stage sun gear 326 near a downstream side thereof. The second-stage sun gear 326 also has teeth or splines that mesh with a set of second-stage planet gears 328 that are supported by a second-stage carrier 330 and engage with the ring gear 306. The second-stage planet gears 328 mount to pinions of the second-stage carrier 330 enabling each second-stage planet gear 328 to rotate relative to the second-stage carrier 330 about individual rotation axes as well as collectively revolve about the second-stage sun gear 326 when the carrier 330 is permitted to rotate. Each second-stage planet gear 328 may have the same or a different number of teeth relative to a corresponding first-stage planet gear 322.

As noted, the first-stage sun gear 320 is coupled to the drive shaft 122 by toothed or splined engagement between the drive shaft 122 and the sleeve 274 as well as between the sleeve 274 and the sun gear 320. The first-stage sun gear 320 is fixed (e.g., by a locking ring, press-fit, etc.) to the sleeve 274 so that the axial position of the first-stage sun gear 320 is fixed relative to the sleeve 274. The second-stage sun gear 326, however, is fixed axially by the second-stage carrier 330 and/or engagement with the first-stage carrier 324, rather than by the sleeve 274 and is thereby permitted to translate axially relative to the sleeve 274, or more specifically, the sleeve 274 is permitted to translate axially when effecting the third operational mode by engagement and disengagement of the third clutch 270, as described further below.

The first-stage sun gear 320, the second-stage sun gear 326 and the second-stage carrier 330 each define one or more features that allow for interlocking engagement when one of the first, second and third clutches 230, 250, 270 are engaged. More specifically, the second-stage carrier 330 includes one or more features 332 that may be caused to interlock with the one or more features 242 of the first clutch 230, the second-stage sun gear 326 includes one or more features 334 that may be caused to interlock with the one or more features 262 of the second clutch 250, and the first-stage sun gear 320 includes one or more features 336 that may be caused to interlock with the one or more features 312 of the housing cover 308/output hub 310. In the depicted example, these features are defined as followed: (a) four identical equiangularly spaced apart, axially raised projections or dogs 242 at the downstream side of the ring 232 of the first clutch 230 are located and configured to mate (i.e., inter-fit) with four identical equiangularly spaced apart recesses 332 at the upstream side of the second-stage carrier 330; (b) four identical equiangularly spaced apart, axially raised projections or dogs 262 at the downstream side of the ring 252 of the second clutch 250 are located and configured to mate (i.e., rotationally interlock) with four identical equiangularly spaced apart, axially raised projections or dogs 334 at the upstream side of the second-stage sun gear 326; and (c) four identical equiangularly spaced apart, axially raised projections or dogs 336 at the downstream side of the first-stage sun gear 320 are located and configured to mate (i.e., inter-fit) with four identical equiangularly spaced apart recesses 312 at the upstream side of the gear housing cover 308/output hub 310.

Figure 11A:
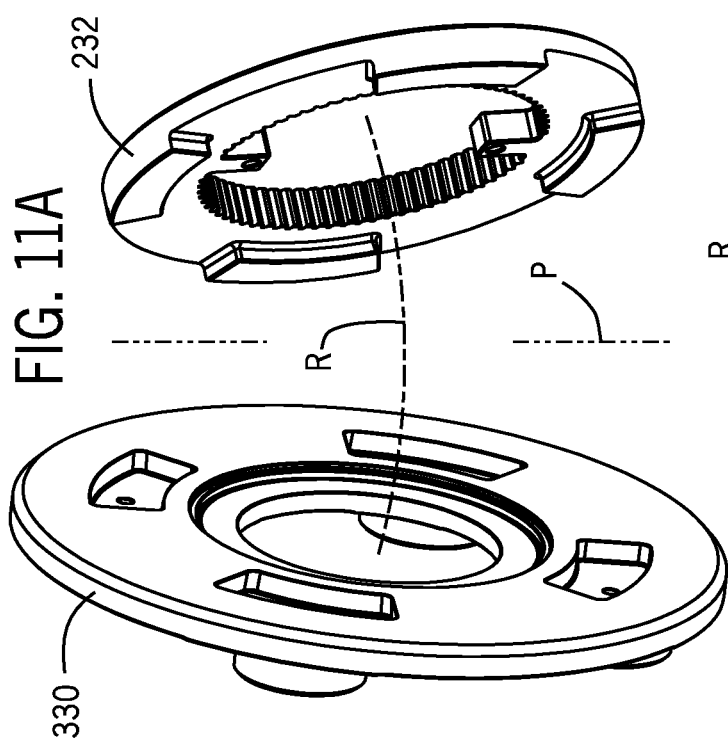
FIGS. 11A-11C are views showing interlocking features for one example clutch arrangement in the example drive assembly, including FIG. 11A showing the interlocking features in isometric view, FIG. 11B showing the interlocking features in elevational view, and FIG. 11C showing the interlocking features in enlarged detail section view at area 11C-11C of FIG. 11B.
Figure 11B:
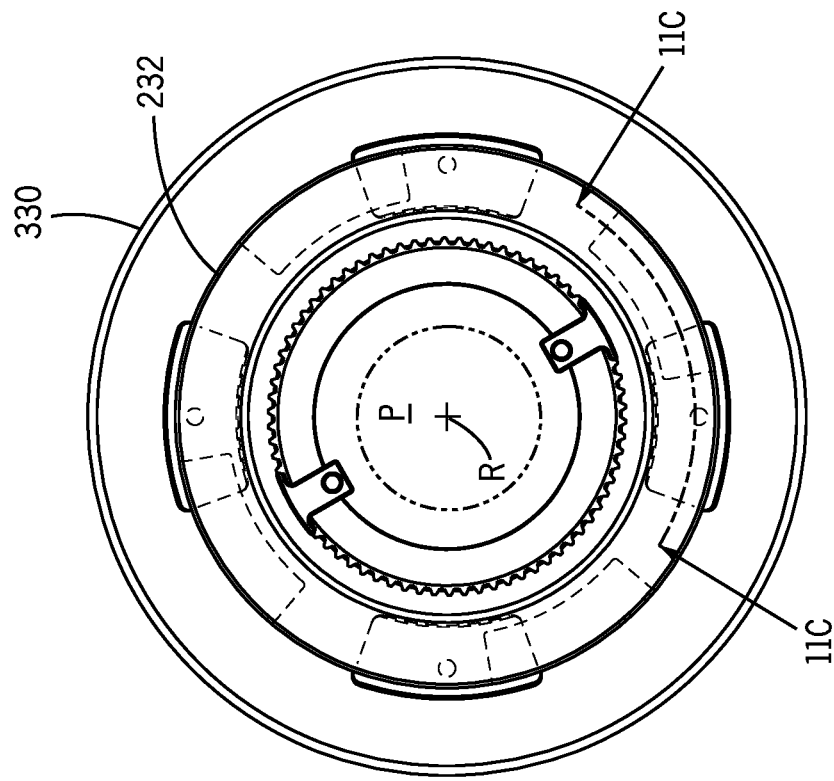
Figure 11C:
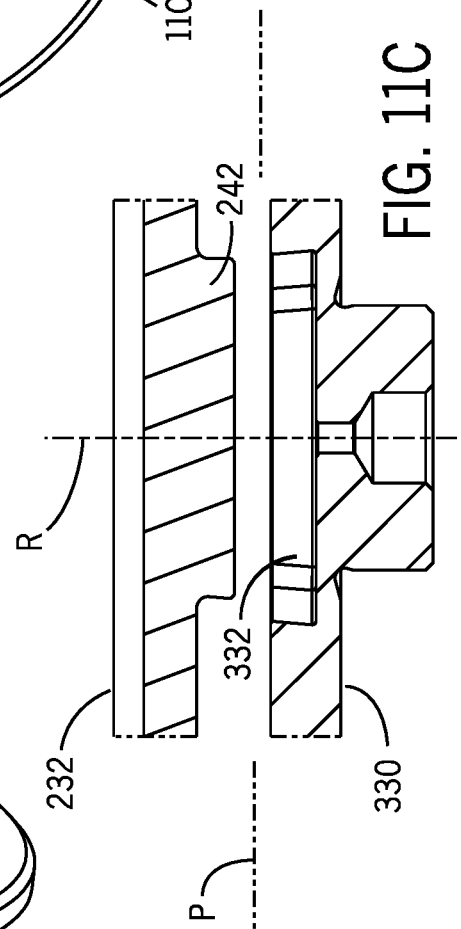

It should be understood that the male-female relationship of the dogs and recesses may be reversed. Moreover, the size, configuration and locations of some or all of the mating features may differ from that shown and described herein. Although, the mating features should be configured to provide interlocking engagement sufficient to transfer rotational power between the mating parts while permitting their selective disengagement. It is also noted that the mating features do not have large transition features (e.g., ramped surfaces, cams or the like, and not including small corner radiuses) that ease engagement and disengagement and vary significantly from one rotational side to the other, such that the mating features may function in a like manner in both clock directions about the rotation axis R. Rather, each of the interlocking features of the clutches 230, 250, 270, be it a raised projection or a recessed pocket, is substantially symmetrical within one or more planes that is/are perpendicular to the rotation axis R, such as would be parallel to the broad upstream face of the carrier 330, depicted in FIG. 11. FIGS. 11A-11C show the ring 232 of the first clutch 230 and the second-stage carrier 330 and depict the symmetrical nature relative to the plane P of the axially projecting dogs 242 of the ring 232 as well as the mating recesses 332 in the second-stage carrier 330. As can be seen, each interlocking feature has opposite end faces (left and right sides in FIGS. 11B and 11O) that are substantially the same shape such that each present effectively the same leading edge when rotated clockwise as when rotated counter-clockwise. Although not shown in FIGS. 11A-11C and of different configurations, the interlocking features of the second and third clutches 250, 270 also have symmetric aspects with respect to planes parallel to plane P in a similar manner. Symmetrically configured interlocking features lend a bi-directional aspect to the clutch assembly 102 that allows the drive assembly 56 to operate, at either the input or output sides, alternatively in each clock direction, as needed for a specific application, since each of the clutches 230, 250, 270 may be engaged in either clock direction. Thus, a common drive assembly configuration may be used for the wheel end drives 50 at the front and rear wheels 34, 36 at both the left and right sides of the work vehicle 20 despite the rotational output needing to be different at the left side than at the right side of the work vehicle 20 in order to provide coordinate forward or reverse travel. The control system 30 only needs to command the electric machine(s) 52 to operate in opposite rotational directions at the left side drives as compared to the right side drives. Moreover, the bi-directional aspect of the clutches 230, 250, 270 allows different operational modes to be achieved by reversing electric machine shaft rotation direction in one or more modes as compared to one or more other modes. Such bi-directionality permits the drive assembly 56 to change operational modes (gear ratios/speeds/torques) by reversing the input power direction from one mode to the next. Further, to facilitate smooth engagement and disengagement of the interlocking features without transition surfaces, the control system 30 may be programmed to control the electric machines 52 in an indexed or sequenced manner that is timed to speed match the mating clutch and gear set components. For example, the control system software may have a sequence based on speed and torque to engage and disengage the clutch dogs with less disturbance to the drive assembly 56.

As introduced above, the actuator arrangement 100 operates to actuate the clutch assembly 102, which is configured to selectively engage and disengage various components of the planetary set 104 with the drive housing 106 (or reaction member), thereby fixedly grounding such components, to effect a gear ratio and power flow according to the modes noted above. The operation of the drive assembly 56 will now be described in detail with reference to FIGS. 8-10. The views FIGS. 8A, 9A and 10A depict the clutch assembly 102 in engaged positions to effect the respective first, second and third modes of operation of the drive assembly 56, and thereby the wheel end drive 50, and depict (by arrowed lines) the respective power flows paths. The views FIGS. 8B, 9B and 10B depict the respective first, second and third clutches 230, 250, 270 when disengaged.

FIG. 8B depicts the first clutch 230 in the disengaged position and configured to be actuated by the solenoids 140, 150 via the linkage assemblies 142, 152 and actuation pins 146, 156. In this example, the solenoids 140, 150 are energized to extend the armatures 141, 151. As noted above, the first clutch 230 is mounted on the stationary hub 220 of the drive housing 106, and the solenoids 140, 150 are mounted on the stationary support plate 110. As the solenoids 140, 150 are energized, the armatures 141, 151 extend outward to pivot the link members 143, 153 about the pivot members 144, 154 such that the actuation pins 146, 156 axially reposition the ring 232 of the first clutch 230 so that the dogs 242 interlock or engage with the recesses 332 in the second-stage carrier 330 to ground the second-stage carrier 330 to the stationary hub 220 and prevent its rotation, as shown in FIG. 8A. At this time, the second and third clutches 250, 270 are maintained in the disengaged positions shown in FIGS. 9B and 10B such that the second-stage sun gear 326 can rotate about the rotation axis R and the first-stage sun gear 320 is disengaged from the housing cover 308. Rotation of the drive shaft 122 drives rotation of the sleeve 274 and thereby the first-stage sun gear 320, and in turn, rotation of the first-stage sun gear 320 drives rotation of the first-stage planet gears 322. The first-stage planet gears 322 drive the first-stage carrier 324, which as noted above is toothed or splined to the second-stage sun gear 326. As a result, the first-stage carrier 324 drives the second-stage sun gear 326 and thereby the second-stage planet gears 328. With the second-stage carrier 330 now grounded by the first clutch 230, rotation of the first-stage sun gear 320 causes the first-stage planet gears 322 to revolve and the second-stage planet gears 328 rotate in fixed orbital positions, and together the planet gears 322, 328 drive the common ring gear 306. Since the number of first-stage and second-stage planet gears 322, 328 in the power flow path of each stage is an odd number (e.g., 1), the ring gear 306 rotates in the opposite direction relative to the sun gears 320, 326, such that the output hub 310, and thereby the output to the outboard wheel end 58, rotates opposite the drive shaft 122 and the input shaft 80, and possibly also the electric machines 52 depending on the presence and configuration of the input gear set 54. Thus, in the first mode of operation, the drive assembly 56 operates in a sun-in, ring-out configuration with input rotation in a first clock direction, and with solenoid-applied, spring-returned actuation of the first clutch 230. The first mode of operation causes a first gear ratio in the planetary set 104 that effects a first speed and torque to be output. The first mode of operation may be a low mode corresponding to the lowest speed and highest torque power output from the drive assembly 56 and thereby from the wheel end drive 50.

In order to transition into another mode, the solenoids 140, 150 are repositioned (e.g., de-energized, in this example) and the first clutch 230 may be moved back into the disengaged position, shown in FIG. 8B. This may be implemented in a number of ways. In the depicted example the solenoids 140, 150, and thereby the first clutch 230, are reset by spring force. By way of example, springs 340 may be provided about the actuation pins 146, 156 such that, upon removal of the force from the solenoids 140, 150, the springs 340 bias the first clutch 230 back into the disengaged position. In another implementation, a spring (not shown) may be provided within each of the solenoids 140, 150 such that, upon deactivation of the solenoids 140, 150, the springs pull the armatures 141, 151, and thus, the linkage assemblies 142, 152, the actuation pins 146, 156, and first clutch 230 back into the disengaged positions. In another implementation, the solenoids 140, 150 may be provided with a pull command (e.g., with an opposite current to the engage command) that functions to pull the armatures 141, 151, linkage assemblies 142, 152, actuation pins 146, 156, and the first clutch 230 back into the disengaged positions.

FIG. 9B depicts the second clutch 250 in the disengaged position and configured to be actuated by the solenoids 160, 170 via the linkage assemblies 162, 172 and actuation pins 166, 176. In this example, the solenoids 160, 170 are energized to extend the armatures 161, 171. Like the first clutch 230, the second clutch 250 is mounted on the stationary hub 220 of the drive housing 106, and the solenoids 160, 170 are mounted on the stationary support plate 110. As the solenoids 160, 170 are energized, the armatures 161, 171 extend outward to pivot the link members 163, 173 about the pivot members 164, 174 such that the actuation pins 166, 176 axially reposition the ring 252 of the second clutch 250 so that the dogs 262 interlock or engage with the recesses 334 in the second-stage sun gear 326 to ground the second-stage sun gear 326 to the stationary hub 220 and prevent its rotation, as shown in FIG. 9A. At this time, the first and third clutches 230, 270 are maintained in the disengaged positions shown in FIGS. 8B and 10B such that the second-stage carrier 330 is not inhibited by the first clutch 230 from rotating about the rotation axis R and the first-stage sun gear 320 is disengaged from the housing cover 308. Rotation of the drive shaft 122 drives rotation of the sleeve 274 and thereby the first-stage sun gear 320, and in turn, rotation of the first-stage sun gear 320 drives rotation of the first-stage planet gears 322. The first-stage planet gears 322 no longer drive the first-stage carrier 324, which is now fixed due to the toothed or splined connection to the grounded second-stage sun gear 326. As a result, the first-stage planet gears 322, rotated by the first-stage sun gear 320 within a fixed orbital position, drive the ring gear 306. Power flows primarily through the first-stage planetary set in the second operational mode of the drive assembly 56, since the second-stage planet gears 328 are allowed to orbit about the second-stage sun gear 326 as the second-stage carrier 330 rotates. Like the first mode, in the second mode, the ring gear 306 rotates in the opposite direction relative to the sun gears 320, 326, such that the output hub 310, and thereby the output to the outboard wheel end 58, rotates opposite the drive shaft 122 and the input shaft 80, and possibly also the electric machines 52 depending on the presence and configuration of the input gear set 54. Thus, in the second mode of operation, the drive assembly 56 again operates in a sun-in, ring-out configuration with input rotation in the first clock direction, and with solenoid-applied, spring-returned actuation of the second clutch 250. The second mode of operation causes a second gear ratio in the planetary set 104 that effects a second speed and torque to be output. The second mode of operation may be a mid mode corresponding to a higher speed and lower torque power output from the drive assembly 56 and thereby from the wheel end drive 50 as compared to the first mode.

In order to transition into another mode, the solenoids 160, 170 are repositioned (e.g., de-energized, in this example) and the second clutch 250 may be moved back into the disengaged position, shown in FIG. 9B. Again, this may be implemented in a number of ways. In the depicted example the solenoids 160, 170, and thereby the second clutch 250, are reset by spring force. By way of example, springs 340 may be provided about the actuation pins 166, 176 such that, upon removal of the force from the solenoids 160, 170, the springs 340 bias the second clutch 250 back into the disengaged position. In another implementation, a spring (not shown) may be provided within each of the solenoids 160, 170, in the manner noted above, or the solenoids 160, 170 may be configured to implement a pull command that functions to pull the armatures 161, 171, the linkage assemblies 162, 172, the actuation pins 166, 176, and the second clutch 250 back into the disengaged positions.

FIG. 10B depicts the third clutch 270 in the disengaged position and configured to be actuated by the solenoids 180, 190, 200 via the linkage assemblies 182, 192, 202 and actuation pins 186, 196, 206. As noted above, the third clutch 270 includes the ring 272, which is engaged by the sleeve 274 through the thrust bearing 282. The sleeve 274 is moved axially into the engaged position by an apply spring 350, which is larger and has a higher spring rate than the return springs 340, and is mounted about the rotation axis R within an open-ended cavity 285 at the flanged end 284 of the sleeve 274. During the first and second operational modes, the solenoids 180, 190, 200 are energized to pull in the armatures 181, 191, 201, which pivots the link members 183, 193, 203 about the pivot members 184, 194, 204 and pulls the actuation pins 186, 196, 206 to overcome the spring force of the apply spring 350 and keep the third clutch 270 disengaged. When the third clutch 270 is to be engaged, the control system 30 may command the solenoids 180, 190, 200 (e.g., by deenergizing) to release the armatures 181, 191, 201 so that that may be pulled out from the solenoids 180, 190, 200 under spring force and reversal of the link members 183, 193, 203, the pivot members 184, 194, 204 and the actuation pins 186, 196, 206. As such, in this example, the solenoids 180, 190, 200 are energized for disengagement and de-energized for engagement of the third clutch 270.

The axial sliding or translation of the sleeve 274 enables interaction between the planetary set 104 and the third clutch 270, and thereby with the grounded reaction member or hub 220 of the drive housing 106. Generally, repositioning the sleeve 274 selectively locks the drive shaft 122 to the gear housing cover 308, thus locking the drive shaft 122 to the ring gear 306 and the output hub 310. In particular, the first-stage sun gear 320 is splined to the sleeve 274. As the third clutch 270 is engaged, the apply spring 350 pushes the sleeve 274, the thrust bearing 282 and the ring 272 to translate along the rotation axis R, which in turn translates the first-stage sun gear 320, which is fixedly splined to the sleeve 274, away from the second-stage sun gear 326 and toward the housing cover 308 such that the dogs 336 of the first-stage sun gear 320 engage the recesses 312 in the housing cover 308, resulting in a direct rotational connection between the drive shaft 122 and the housing cover 308, and thereby between the drive shaft 122 and ring gear 306 and the output hub 310. With the first clutch 230 in the disengaged position, the second-stage carrier 330 is not ground, and with the second clutch 250 in the disengaged position, the second-stage sun gear 326, and thereby the first-stage carrier 324 is also not grounded. In this arrangement, the planetary set 104 may be considered "locked" or otherwise to rotate as a unit such that no gear reduction is effected within the planetary set 104, thereby providing direct power transmission in a 1:1 gear ratio. Thus, in the third mode of operation, the drive assembly 56 again operates in a sun-in, ring-out configuration with input rotation in a second clock direction (opposite the first clock direction of the output in the first and second modes), and with spring-applied, solenoid-returned actuation of the third clutch 270. The direct drive, 1:1 gear ratio of the third mode of operation thus effects a third speed and torque to be output. The third mode of operation may be a high mode corresponding to a higher speed and lower torque power output from the drive assembly 56 and thereby from the wheel end drive 50 as compared to the both the first and second modes. In order to transition into another mode, the solenoids 180, 190, 200 are controlled (e.g., energized to pull, in this example) so that the third clutch 270 may be moved back into the disengaged position.

Enumerated Examples of Bi-Directional Multi-Speed Drive

The following examples of the bi-directional drive assembly are further provided and numbered for ease of reference.

1. A bi-directional drive assembly for a work vehicle including: a reaction member fixed with respect to or a part of a drive housing of the drive assembly; a drive shaft rotatable about a drive axis relative to the reaction member in a first rotation direction and alternatively a second rotation direction; a planetary set coupled to the drive shaft and configured to rotate an output hub in the first rotation direction and alternatively the second rotation direction; a clutch assembly coupled to the reaction member and including a first clutch and a second clutch, the first clutch is configured to interface the planetary set with the reaction member to effect a first rotation speed of the output hub in the first rotation direction and alternatively the second rotation direction and the second clutch is configured to interface the planetary set with the reaction member to effect a second rotation speed of the output hub in the first rotation direction and alternatively the second rotation direction; and an actuator arrangement configured to effect movement of the first clutch and the second clutch along the drive axis to selectively engage the planetary set.

2. The bi-directional drive assembly of example 1, wherein the first clutch and the second clutch are interlocking clutches having mating interlocking features that are symmetrical with respect to one or more planes perpendicular to the drive axis.

3. The bi-directional drive assembly of example 1, wherein the planetary set includes at least one sun gear, at least one carrier and at least one ring gear; and wherein the first clutch engages the at least one carrier to interface with the reaction member to effect the first rotation speed of the output hub.

4. The bi-directional drive assembly of example 1, wherein the planetary set includes at least one sun gear, at least one carrier and at least one ring gear; and wherein the second clutch engages the at least one sun gear to interface with the reaction member to effect the second rotation speed of the output hub.

5. The bi-directional drive assembly of example 1, wherein the clutch assembly includes a third clutch configured to interface the planetary set with the reaction member to effect a third rotation speed of the output hub in the first rotation direction and alternatively the second rotation direction.

6. The bi-directional drive assembly of example 5, wherein the planetary set includes at least one sun gear; and wherein the third clutch engages the at least one sun gear to interface with the output hub to effect the third rotation speed.

7. The bi-directional drive assembly of example 1, wherein the planetary set includes: a first-stage sun gear coupled to the drive shaft; a first-stage carrier; a second-stage sun gear coupled to the first-stage carrier; a second-stage carrier; and a ring gear coupled to the output hub.

8. The bi-directional drive assembly of example 7, wherein the first clutch engages the second-stage carrier to interface with the reaction member to effect the first rotation speed of the output hub.

9. The bi-directional drive assembly of example 7, wherein the second clutch engages the second-stage sun gear to interface with the reaction member to effect the second rotation speed of the output hub.

10. The bi-directional drive assembly of example 7, wherein the clutch assembly includes a third clutch configured to interface the planetary set with the reaction member to effect a third rotation speed of the output hub in the first rotation direction; and wherein the third clutch engages the first-stage sun gear to interface with the output hub to effect the third rotation speed of the output hub.

11. The bi-directional drive assembly of example 10, wherein the third clutch includes a ring and a sleeve configured to engage the first-stage sun gear, the ring and the sleeve being disposed about the drive shaft and movable along the drive axis.

12. The bi-directional drive assembly of example 1, wherein the actuator arrangement includes a plurality of electromagnetic solenoids mounted fixed with respect to the reaction member, the plurality of electromagnetic solenoids includes: a first solenoid with a first armature; and a first linkage assembly with a first actuation pin coupled to the first clutch and with a first link member extending between the first armature and the first actuation pin; wherein actuation of the first solenoid moves the first armature and the first link member to shift the first actuation pin and the first clutch along the drive axis to engage the planetary set.

13. The bi-directional drive assembly of example 12, wherein the plurality of electromagnetic solenoids includes: a second solenoid with a second armature; and a second linkage assembly with a second actuation pin coupled to the second clutch and with a second link member extending between the second armature and the second actuation pin; wherein actuation of the second solenoid moves the second armature and the second link member to shift the second actuation pin and the second clutch along the drive axis to engage the planetary set.

14. The bi-directional drive assembly of example 13, wherein the clutch assembly includes a third clutch configured to interface the planetary set with the reaction member to effect a third rotation speed of the output hub; wherein the plurality of electromagnetic solenoids includes: a third solenoid with a third armature; and a third linkage assembly with a third actuation pin coupled to the third clutch and with a third link member extending between the third armature and the third actuation pin; wherein actuation of the third solenoid moves the third armature and the third link member to shift the third actuation pin and the third clutch along the drive axis to disengage the output hub.

15. The bi-directional drive assembly of example 14, wherein the first clutch, the second clutch and the third clutch are interlocking clutches having mating interlocking features that are symmetrical with respect to one or more planes perpendicular to the drive axis; and wherein the third rotation speed of the output hub is greater than the second rotation speed of the output hub which is greater than the first rotation speed of the output hub; and wherein the third rotation speed of the output hub matches a rotation speed of the drive shaft.

CONCLUSION

The foregoing has thus provided embodiments of a bi-directional drive assembly that may be employed advantageously in a work vehicle, such as part of a wheel end drive. The drive assembly may provide multiple speeds or gear ratios and transition between speeds/gear ratios. One or more clutch assemblies may be used to selectively change gear ratios. Using a planetary gear set in the drive assembly provides high gear reduction and torque capabilities with reduced backlash in a compact space envelope. Embodiments discussed above include a double planetary gear set, sun in, ring out configuration for each of multiple operating modes at different speed and torques, including a direct drive mode in which the input to the drive assembly matches its output. As such, a three-mode assembly may be provided.

Embodiments discussed above also provide for bi-directional operation (engagement) of the clutch assembly, that is each of the clutches may be engaged in both clock directions of rotation. The drive assembly, and thereby the wheel end drive (or other drive system), thus is not limited in input or output direction. Thus, a common drive assembly configuration may be used for the wheel end drives of the front and rear wheels at both the left and right sides of the vehicle, requiring only that the electric machine(s) be operated in opposite rotational directions at the left side drives as compared to the right side drives. Moreover, operational modes may be achieved by reversing motor direction in one or more modes as compared to one or more other modes, thereby facilitating gear ratio/speed/torque selection.

The clutch assembly and its actuator arrangement may be mounted to the drive housing, which may act as a stationary reaction member with respect to the actuator arrangement and the clutch assembly. Since the actuator arrangement and clutch assembly may be non-rotating, and stationary, the clutch assembly may effect gear ratio change by tying components of a planetary set to ground. Electric and hydraulic lines feeding the actuator arrangement and the clutch assembly may be provided readily without the need to interface with rotating parts. The use of one or more electric machines as power input to the wheel end drive and electromagnetic solenoids to reposition locking dog clutches, to thereby change gear ratios in the drive assembly, provides a compact drive assembly without high pressure electro-hydraulic solenoids, while enabling improved packaging, wire routing, and package size.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A bi-directional drive assembly for a work vehicle comprising:
    a reaction member fixed with respect to or a part of a drive housing of the drive assembly;
    a drive shaft rotatable about a drive axis relative to the reaction member in a first rotation direction and alternatively a second rotation direction;
    a planetary set coupled to the drive shaft and configured to rotate an output hub in the first rotation direction and alternatively the second rotation direction;
    a clutch assembly coupled to the reaction member and including a first clutch, a second clutch and a third clutch, the first clutch is configured to interface the planetary set with the reaction member to effect a first rotation speed of the output hub in the first rotation direction and alternatively the second rotation direction, the second clutch is configured to interface the planetary set with the reaction member to effect a second rotation speed of the output hub in the first rotation direction and alternatively the second rotation direction, and the third clutch is configured to interface the planetary set with the reaction member to effect a third rotation speed of the output hub in the first rotation direction and alternatively the second rotation direction; and
    an actuator arrangement configured to effect movement of the first clutch and the second clutch along the drive axis to selectively engage the planetary set.

2. The bi-directional drive assembly of claim 1, wherein the first clutch and the second clutch are interlocking clutches having mating interlocking features that are symmetrical with respect to one or more planes perpendicular to the drive axis.

3. The bi-directional drive assembly of claim 1, wherein the planetary set includes at least one sun gear, at least one carrier and at least one ring gear; and
    wherein the first clutch engages the at least one carrier to interface with the reaction member to effect the first rotation speed of the output hub.

4. The bi-directional drive assembly of claim 1, wherein the planetary set includes at least one sun gear, at least one carrier and at least one ring gear; and
    wherein the second clutch engages the at least one sun gear to interface with the reaction member to effect the second rotation speed of the output hub.

5. The bi-directional drive assembly of claim 1, wherein the planetary set includes at least one sun gear; and
    wherein the third clutch engages the at least one sun gear to interface with the output hub to effect the third rotation speed.

6. A bi-directional drive assembly for a work vehicle comprising:
    a reaction member fixed with respect to or a part of a drive housing of the drive assembly;
    a drive shaft rotatable about a drive axis relative to the reaction member in a first rotation direction and alternatively a second rotation direction;
    a planetary set coupled to the drive shaft and configured to rotate an output hub in the first rotation direction and alternatively the second rotation direction;
    a clutch assembly coupled to the reaction member and including a first clutch and a second clutch, the first clutch is configured to interface the planetary set with the reaction member to effect a first rotation speed of the output hub in the first rotation direction and alternatively the second rotation direction and the second clutch is configured to interface the planetary set with the reaction member to effect a second rotation speed of the output hub in the first rotation direction and alternatively the second rotation direction; and
    an actuator arrangement configured to effect movement of the first clutch and the second clutch along the drive axis to selectively engage the planetary set;
    wherein the planetary set includes:
        a first-stage sun gear coupled to the drive shaft;
        a first-stage carrier;
        a second-stage sun gear coupled to the first-stage carrier;
        a second-stage carrier; and
        a ring gear coupled to the output hub.

7. The bi-directional drive assembly of claim 6, wherein the first clutch engages the second-stage carrier to interface with the reaction member to effect the first rotation speed of the output hub.

8. The bi-directional drive assembly of claim 6, wherein the second clutch engages the second-stage sun gear to interface with the reaction member to effect the second rotation speed of the output hub.

9. The bi-directional drive assembly of claim 6, wherein the clutch assembly includes a third clutch configured to interface the planetary set with the reaction member to effect a third rotation speed of the output hub in the first rotation direction; and
    wherein the third clutch engages the first-stage sun gear to interface with the output hub to effect the third rotation speed of the output hub.

10. The bi-directional drive assembly of claim 9, wherein the third clutch includes a ring and a sleeve configured to engage the first-stage sun gear, the ring and the sleeve being disposed about the drive shaft and movable along the drive axis.

11. A bi-directional drive assembly for a work vehicle comprising:
    a reaction member fixed with respect to or a part of a drive housing of the drive assembly;
    a drive shaft rotatable about a drive axis relative to the reaction member in a first rotation direction and alternatively a second rotation direction;
    a planetary set coupled to the drive shaft and configured to rotate an output hub in the first rotation direction and alternatively the second rotation direction;
    a clutch assembly coupled to the reaction member and including a first clutch and a second clutch, the first clutch is configured to interface the planetary set with the reaction member to effect a first rotation speed of the output hub in the first rotation direction and alternatively the second rotation direction and the second clutch is configured to interface the planetary set with the reaction member to effect a second rotation speed of the output hub in the first rotation direction and alternatively the second rotation direction; and an actuator arrangement configured to effect movement of the first clutch and the second clutch along the drive axis to selectively engage the planetary set;

wherein the actuator arrangement includes a plurality of electromagnetic solenoids mounted fixed with respect to the reaction member, the plurality of electromagnetic solenoids includes:

a first solenoid with a first armature; and a first linkage assembly with a first actuation pin coupled to the first clutch and with a first link member extending between the first armature and the first actuation pin;

wherein actuation of the first solenoid moves the first armature and the first link member to shift the first actuation pin and the first clutch along the drive axis to engage the planetary set.

12. The bi-directional drive assembly of claim 11, wherein the plurality of electromagnetic solenoids includes:

a second solenoid with a second armature; and a second linkage assembly with a second actuation pin coupled to the second clutch and with a second link member extending between the second armature and the second actuation pin;

wherein actuation of the second solenoid moves the second armature and the second link member to shift the second actuation pin and the second clutch along the drive axis to engage the planetary set.

13. The bi-directional drive assembly of claim 12, wherein the clutch assembly includes a third clutch configured to interface the planetary set with the reaction member to effect a third rotation speed of the output hub;

wherein the plurality of electromagnetic solenoids includes:

a third solenoid with a third armature; and a third linkage assembly with a third actuation pin coupled to the third clutch and with a third link member extending between the third armature and the third actuation pin;

wherein actuation of the third solenoid moves the third armature and the third link member to shift the third actuation pin and the third clutch along the drive axis to disengage the output hub.

14. The bi-directional drive assembly of claim 13, wherein the first clutch, the second clutch and the third clutch are interlocking clutches having mating interlocking features that are symmetrical with respect to one or more planes perpendicular to the drive axis.

15. The bi-directional drive assembly of claim 14, wherein the third rotation speed of the output hub is greater than the second rotation speed of the output hub which is greater than the first rotation speed of the output hub; and wherein the third rotation speed of the output hub matches a rotation speed of the drive shaft.

16. A bi-directional drive assembly for a work vehicle comprising:

a reaction member fixed with respect to or a part of a drive housing of the drive assembly;

a drive shaft rotatable about a drive axis relative to the reaction member in a first rotation direction and alternatively a second rotation direction;

a planetary set having a first-stage sun gear coupled to the drive shaft, a first-stage carrier, a second-stage sun gear coupled to the first-stage carrier, a second-stage carrier, and a ring gear coupled to an output hub to rotate in the first rotation direction and alternatively the second rotation direction;

a clutch assembly coupled to the reaction member and including a first clutch and a second clutch, the first clutch is configured to interface the planetary set with the reaction member to effect a first rotation speed of the output hub in the first rotation direction and alternatively the second rotation direction and the second clutch is configured to interface the planetary set with the reaction member to effect a second rotation speed of the output hub in the first rotation direction and alternatively the second rotation direction; and an actuator arrangement configured to effect movement of the first clutch and the second clutch along the drive axis to selectively engage the planetary set.

17. The bi-directional drive assembly of claim 16, wherein the first clutch and the second clutch are interlocking clutches having mating interlocking features that are symmetrical with respect to one or more planes perpendicular to the drive axis.

18. The bi-directional drive assembly of claim 16, wherein the clutch assembly includes a third clutch configured to interface the planetary set with the reaction member to effect a third rotation speed of the output hub;

wherein the first clutch engages the second-stage carrier to interface with the reaction member to effect the first rotation speed of the output hub;

wherein the second clutch engages the second-stage sun gear to interface with the reaction member to effect the second rotation speed of the output hub; and wherein the third clutch engages the first-stage sun gear to interface with the output hub to effect the third rotation speed of the output hub.

19. The bi-directional drive assembly of claim 18, wherein the actuator arrangement includes a plurality of electromagnetic solenoids mounted fixed with respect to the reaction member, the plurality of electromagnetic solenoids includes:

a first solenoid with a first armature, and a first linkage assembly with a first actuation pin coupled to the first clutch and with a first link member extending between the first armature and the first actuation pin, wherein actuation of the first solenoid moves the first armature and the first link member to shift the first actuation pin and the first clutch along the drive axis to engage the planetary set;

a second solenoid with a second armature, and a second linkage assembly with a second actuation pin coupled to the second clutch and with a second link member extending between the second armature and the second actuation pin, wherein actuation of the second solenoid moves the second armature and the second link member to shift the second actuation pin and the second clutch along the drive axis to engage the planetary set; and a third solenoid with a third armature, and a third linkage assembly with a third actuation pin coupled to the third clutch and with a third link member extending between the third armature and the third actuation pin, wherein actuation of the third solenoid moves the third armature and the third link member to shift the third actuation pin and the third clutch along the drive axis to disengage the output hub.

* * * * *